United States Patent
Sheppard et al.

(10) Patent No.: US 11,431,574 B2
(45) Date of Patent: *Aug. 30, 2022

(54) SYSTEM AND METHOD FOR HIERARCHICAL RELATIONSHIP MATRIX OPPORTUNITY SCORING

(71) Applicants: Raymond J. Sheppard, North Palm Beach, FL (US); Alvin Daniel Ray, Plano, TX (US); Robert L. Fike, Point Roberts, WA (US)

(72) Inventors: Raymond J. Sheppard, North Palm Beach, FL (US); Alvin Daniel Ray, Plano, TX (US); Robert L. Fike, Point Roberts, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/553,072

(22) Filed: Aug. 27, 2019

(65) Prior Publication Data
US 2020/0099588 A1    Mar. 26, 2020

Related U.S. Application Data

(60) Provisional application No. 62/723,414, filed on Aug. 27, 2018.

(51) Int. Cl.
*H04L 41/12* (2022.01)
*H04L 41/044* (2022.01)
(Continued)

(52) U.S. Cl.
CPC ......... *H04L 41/12* (2013.01); *G06Q 30/0214* (2013.01); *G06Q 50/16* (2013.01);
(Continued)

(58) Field of Classification Search
CPC ......... H04L 41/12; H04L 67/30; H04L 67/22; H04L 67/32; H04L 41/044; H04L 41/142;
(Continued)

(56) References Cited

U.S. PATENT DOCUMENTS 6,163,607 A * 12/2000 Bogart ................ H04M 3/5233
379/265.02
8,175,920 B2 * 5/2012 Khetrapal .......... G06Q 30/0213
705/14.15

(Continued)

*Primary Examiner* — Ramy M Osman
(74) *Attorney, Agent, or Firm* — Gustavo Marin; Marin Patents LLC

(57) ABSTRACT

Systems and methods for computing communication matrices based on opportunity scoring of a plurality of network-connected user devices. In a preferred embodiment of the invention, a scoring algorithm may compute an opportunity score for future delivery of interactions comprising parameters such as a cumulative time comprising historic and real-time communication time between a client device with an agent; geographic location and distance between a client device and an agent device; a quantity of direct connections for one or more client devices associated to an agent device; a quantity of indirect connections for one or more client devices associated to the agent device; quantity metrics associated to an agent device, for example, a total number of registrations. An interaction manager then routs interactions based on scoring of agent devices.

10 Claims, 18 Drawing Sheets

(51) Int. Cl.
  *H04L 41/142*     (2022.01)
  *H04L 41/0859*    (2022.01)
  *H04L 41/046*     (2022.01)
  *H04L 67/30*      (2022.01)
  *G06Q 50/16*      (2012.01)
  *H04L 67/50*      (2022.01)
  *H04L 67/60*      (2022.01)
  *H04M 3/523*      (2006.01)
  *G06Q 30/02*      (2012.01)

(52) U.S. Cl.
  CPC .......... *H04L 41/044* (2013.01); *H04L 41/046* (2013.01); *H04L 41/0859* (2013.01); *H04L 41/142* (2013.01); *H04L 67/22* (2013.01); *H04L 67/30* (2013.01); *H04L 67/32* (2013.01); *H04M 3/5232* (2013.01)

(58) Field of Classification Search
  CPC ... H04L 41/0859; H04L 41/046; G06Q 50/16; G06Q 30/0201; H04M 3/5232
  See application file for complete search history.

(56) References Cited

U.S. PATENT DOCUMENTS

| | | | |
|---|---|---|---|
| 10,282,798 B2 * | 5/2019 | Sheppard | H04L 67/22 |
| 10,289,967 B2 * | 5/2019 | Stephan | G06Q 10/063 |
| 2003/0083895 A1 * | 5/2003 | Wright | G06Q 30/02 |
| | | | 705/26.1 |
| 2010/0070554 A1 * | 3/2010 | Richardson | G06Q 10/06 |
| | | | 709/202 |
| 2010/0250344 A1 * | 9/2010 | Polston | G06Q 30/018 |
| | | | 705/35 |
| 2010/0332286 A1 * | 12/2010 | Melamed | G06Q 10/10 |
| | | | 705/7.32 |
| 2011/0184874 A1 * | 7/2011 | Wilson | G06Q 50/16 |
| | | | 705/313 |
| 2012/0221390 A1 * | 8/2012 | Codey | G06Q 30/0207 |
| | | | 705/14.17 |
| 2012/0300920 A1 * | 11/2012 | Fagundes | G06Q 10/06 |
| | | | 379/265.05 |
| 2014/0122299 A1 * | 5/2014 | Klein | G06Q 50/16 |
| | | | 705/26.61 |
| 2014/0136296 A1 * | 5/2014 | Fawaz | G06Q 50/16 |
| | | | 705/7.38 |
| 2015/0317581 A1 * | 11/2015 | Fawaz | G06Q 50/16 |
| | | | 705/313 |
| 2017/0228841 A1 * | 8/2017 | Howie | G06Q 50/16 |
| 2017/0308972 A1 * | 10/2017 | Atkins | G06Q 50/14 |
| 2019/0228484 A1 * | 7/2019 | Sheppard | H04L 67/22 |
| 2019/0377571 A1 * | 12/2019 | Gupta | G06F 16/24578 |
| 2020/0099588 A1 * | 3/2020 | Sheppard | H04L 41/12 |
| 2020/0265452 A1 * | 8/2020 | Lippman | G06Q 30/0214 |

* cited by examiner

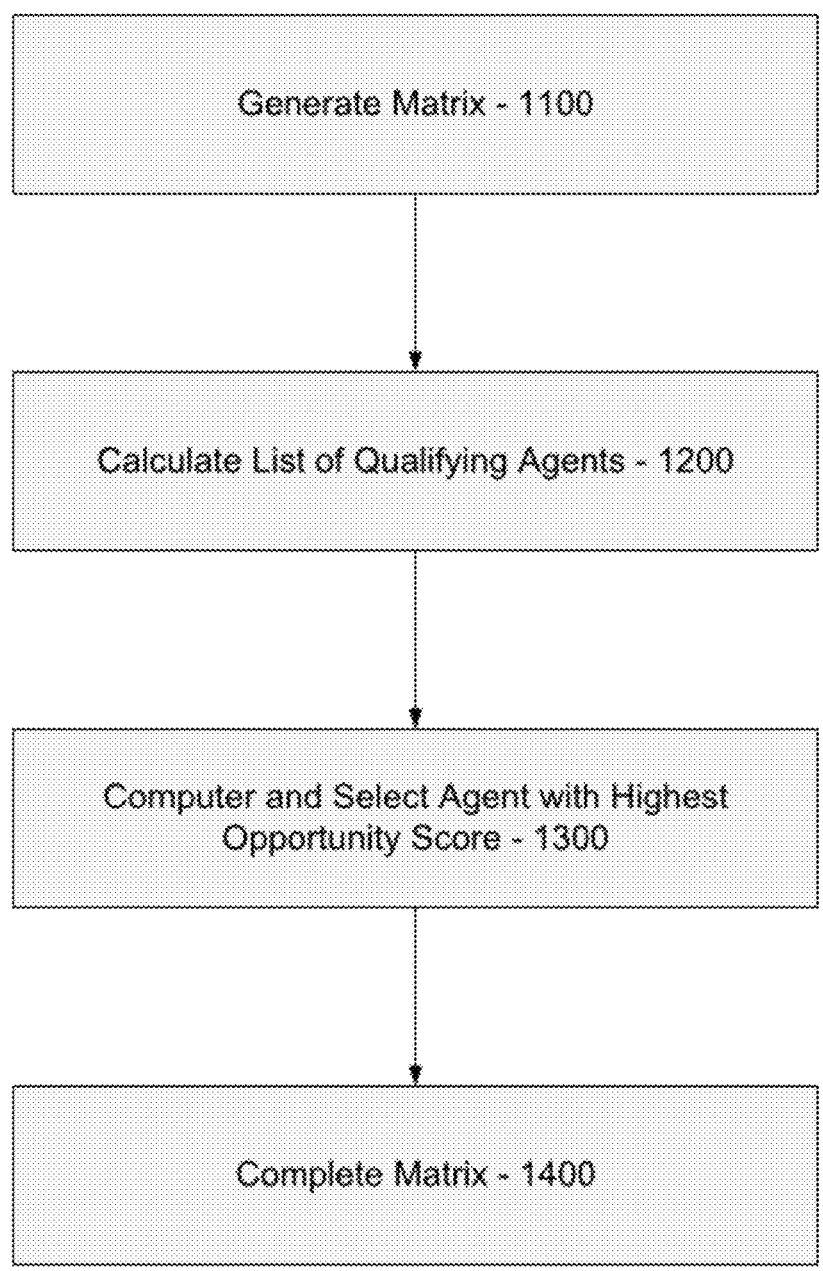
Figure 1 – Opportunity Scoring Algorithm for a Hierarchical Relationship Matrix 1100

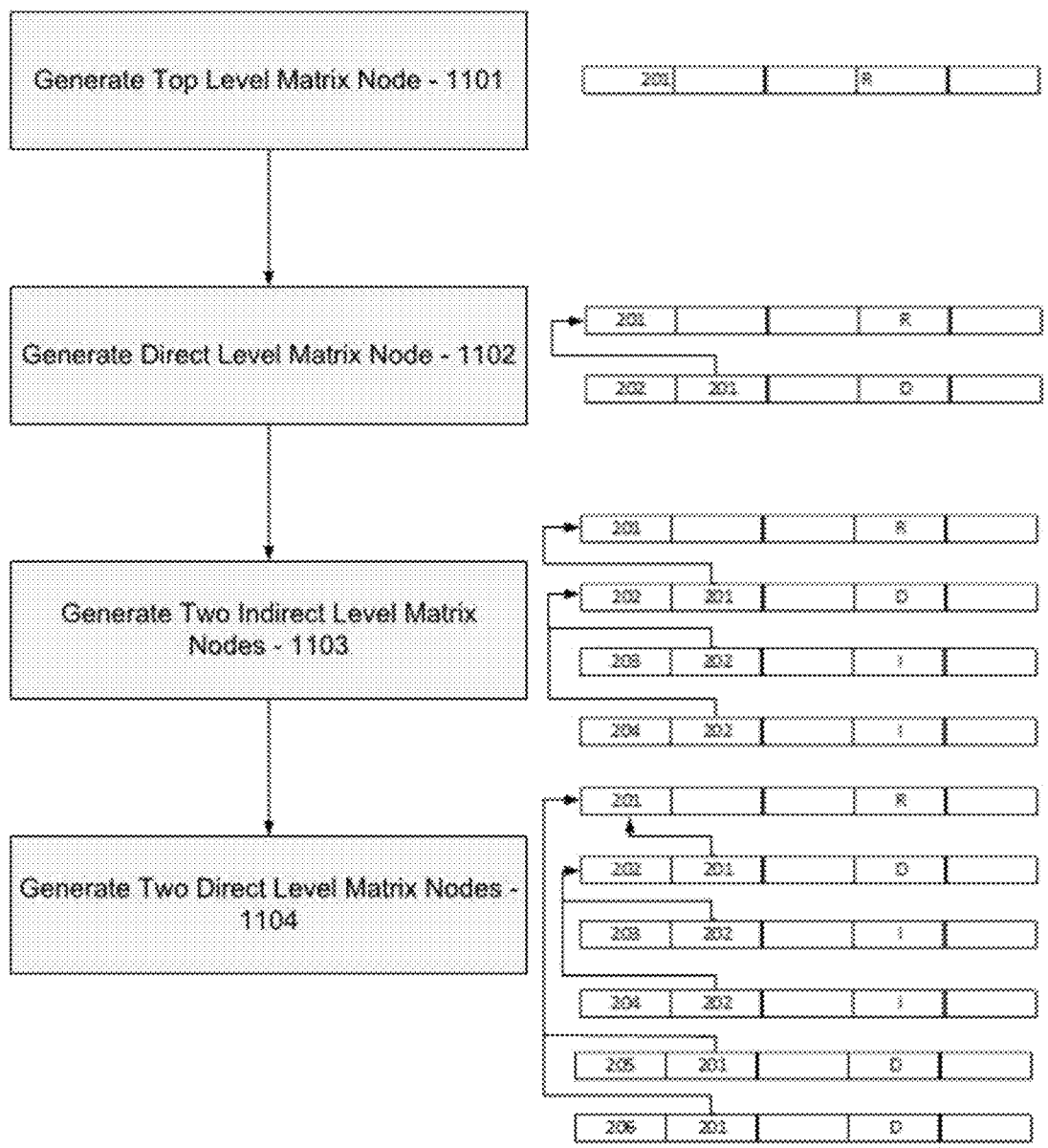
Figure 2 – Matrix Construction

Computer Algorithm for Top Producer

| Device Identity | Quantity | | Quality | | Geolocation | | User Preferences | | Availability | | Credentials | |
|---|---|---|---|---|---|---|---|---|---|---|---|---|
| | Direct | Indirect | CML Time | CML Detail | Distance | Location | Language | MKT Area | Presence | Affirm | Yrs Exp | Designations |
| 1 | | | | | | | | | | | | |
| 2 | | | | | | | | | | | | |
| 3 | | | | | | | | | | | | |
| 4 | | | | | | | | | | | | |
| 5 | | | | | | | | | | | | |
| 6 | | | | | | | | | | | | |
| 7 | | | | | | | | | | | | |
| 8 | | | | | | | | | | | | |
| Weight | 100 | 50 | 100 | 100 | 0 | 100 | 0 | 0 | 0 | 0 | 0 | 0 |

Compute Results

Computer Algorithm for Ask the Expert

| Device Identity | Quantity | | Quality | | Geolocation | | User Preferences | | Availability | | Credentials | |
|---|---|---|---|---|---|---|---|---|---|---|---|---|
| | Direct | Indirect | CML Time | CML Detail | Distance | Location | Language | MKT Area | Presence | Affirm | Yrs Exp | Designations |
| 1 | | | | | | | | | | | | |
| 2 | | | | | | | | | | | | |
| 3 | | | | | | | | | | | | |
| 4 | | | | | | | | | | | | |
| 5 | | | | | | | | | | | | |
| 6 | | | | | | | | | | | | |
| 7 | | | | | | | | | | | | |
| 8 | | | | | | | | | | | | |
| Weight | 100 | 50 | 100 | 100 | 0 | 100 | 0 | 0 | 0 | 0 | 100 | 100 |

Compute Results

Computer Algorithm for Impromptu Appointment

| Device Identity | Quantity | | Quality | | Geolocation | | User Preferences | | Availability | | Credentials | |
|---|---|---|---|---|---|---|---|---|---|---|---|---|
| | Direct | Indirect | CML Time | CML Detail | Distance | Location | Language | MKT Area | Presence | Affirm | Yrs Exp | Designations |
| 1 | | | | | | | | | | | | |
| 2 | | | | | | | | | | | | |
| 3 | | | | | | | | | | | | |
| 4 | | | | | | | | | | | | |
| 5 | | | | | | | | | | | | |
| 6 | | | | | | | | | | | | |
| 7 | | | | | | | | | | | | |
| 8 | | | | | | | | | | | | |
| Weight | 100 | 50 | 100 | 100 | 100 | 100 | 0 | 0 | 100 | 100 | 0 | 0 |

Compute Results

Computer Algorithm for Language Preference

| Device Identity | Quantity | | Quality | | Geolocation | | User Preferences | | Availability | | Credentials | |
|---|---|---|---|---|---|---|---|---|---|---|---|---|
| | Direct | Indirect | CML Time | CML Detail | Distance | Location | Language | MKT Area | Presence | Affirm | Yrs Exp | Designations |
| 1 | | | | | | | | | | | | |
| 2 | | | | | | | | | | | | |
| 3 | | | | | | | | | | | | |
| 4 | | | | | | | | | | | | |
| 5 | | | | | | | | | | | | |
| 6 | | | | | | | | | | | | |
| 7 | | | | | | | | | | | | |
| 8 | | | | | | | | | | | | |
| Weight | 100 | 50 | 100 | 100 | 0 | 100 | 100 | 0 | 0 | 0 | 0 | 0 |

Compute Results

Fig. 2A

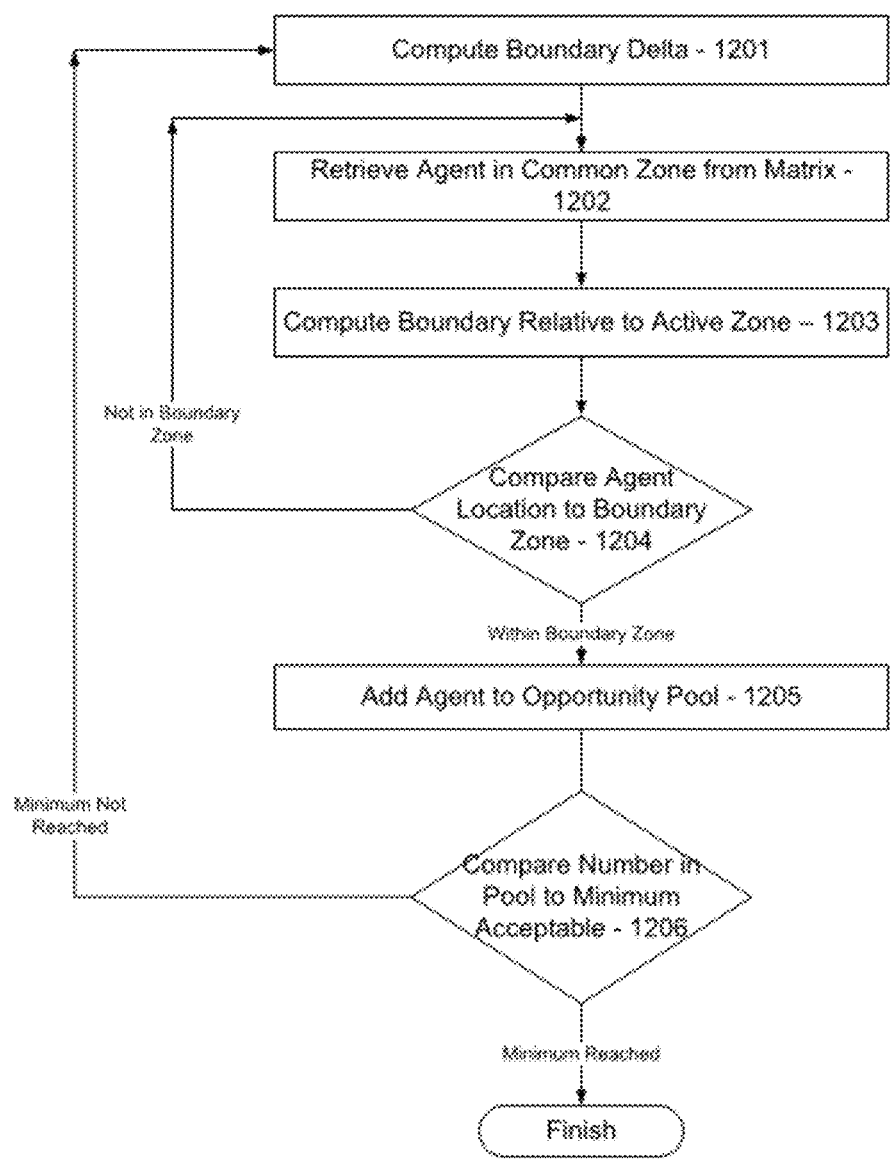

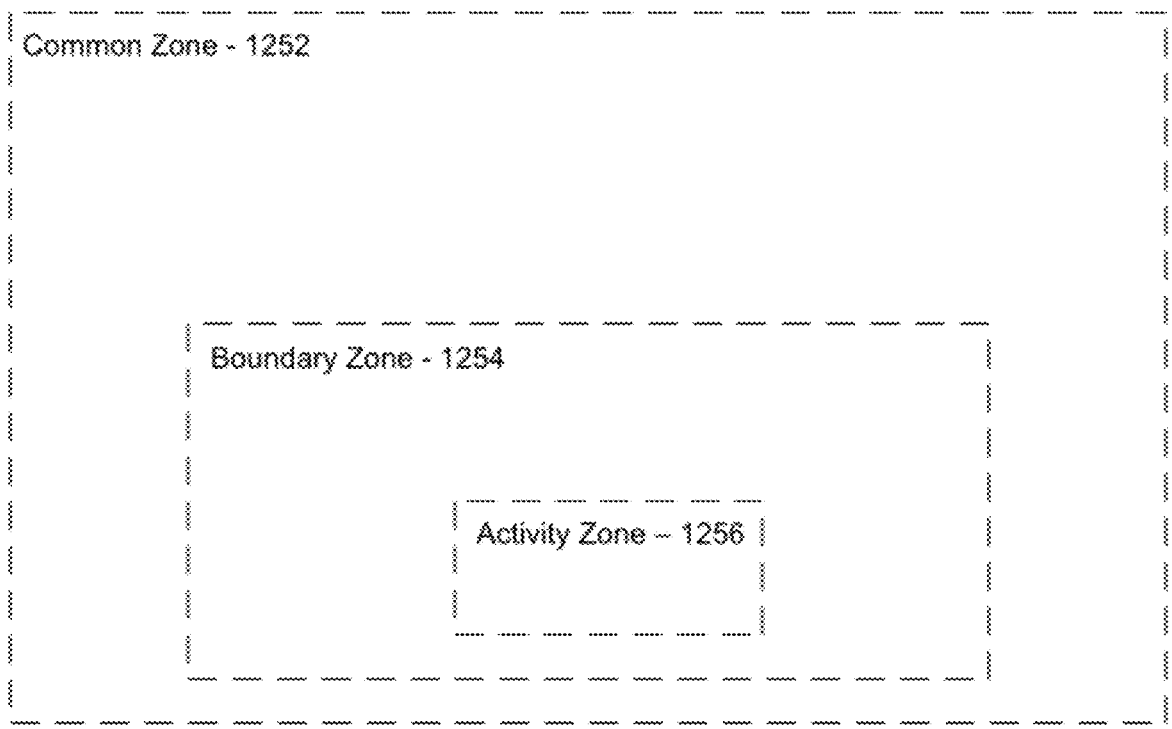

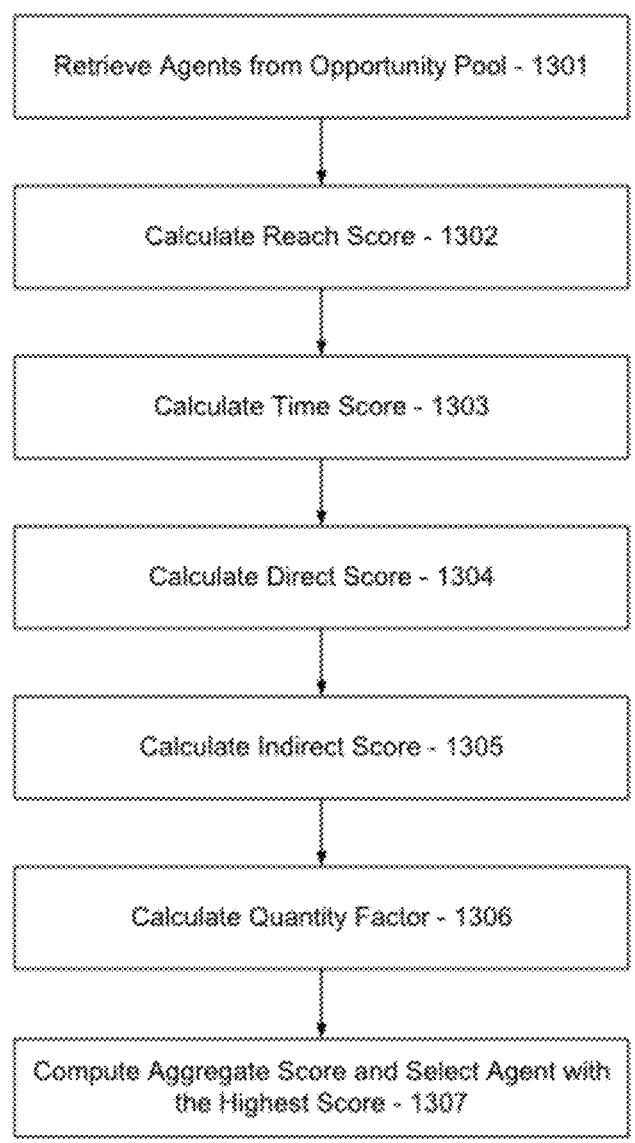

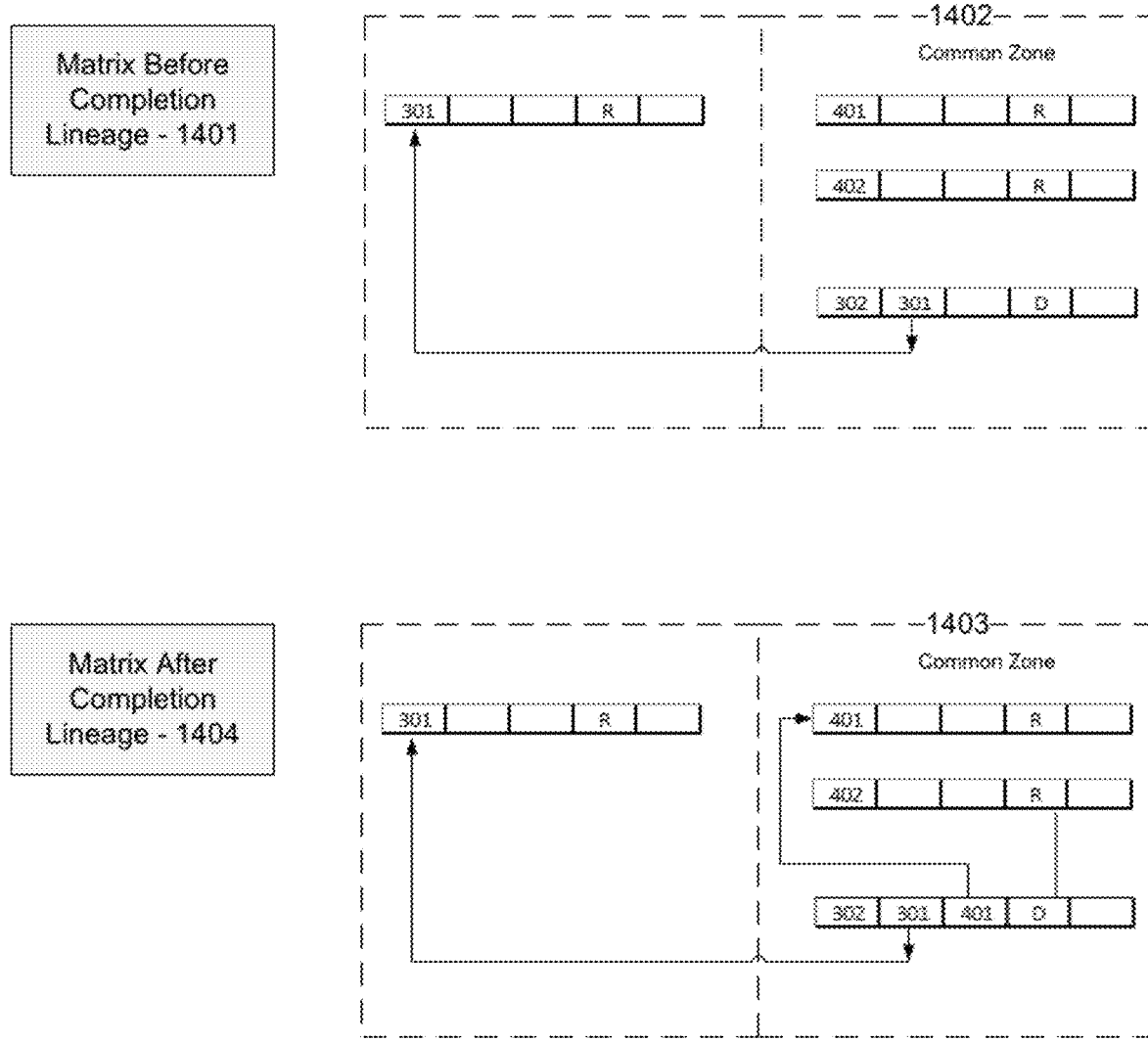
Figure 5 – Completion of the Matrix 1400

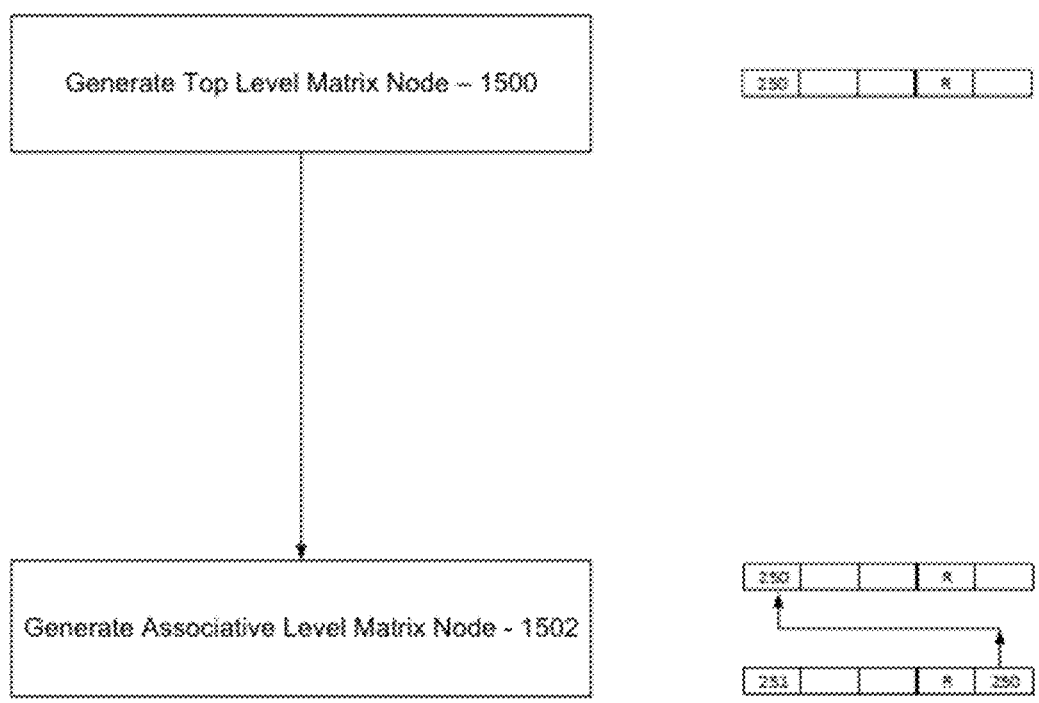
Figure 6 – Associative Level Matrix Example 1500

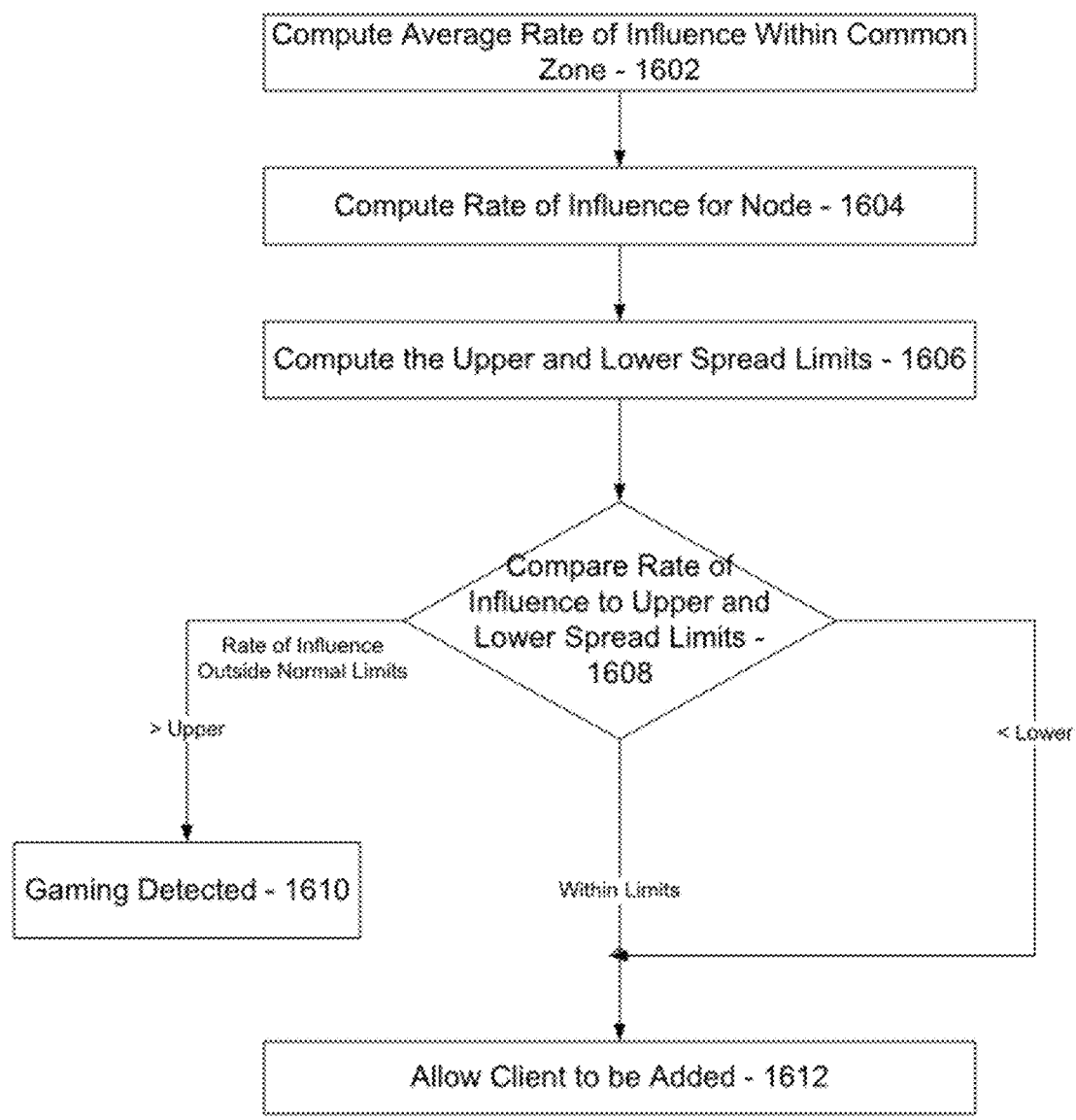
Figure 7 – Rate of Influence "Gaming Detection" 1600

Figure 8 – Orphan Processing 1700
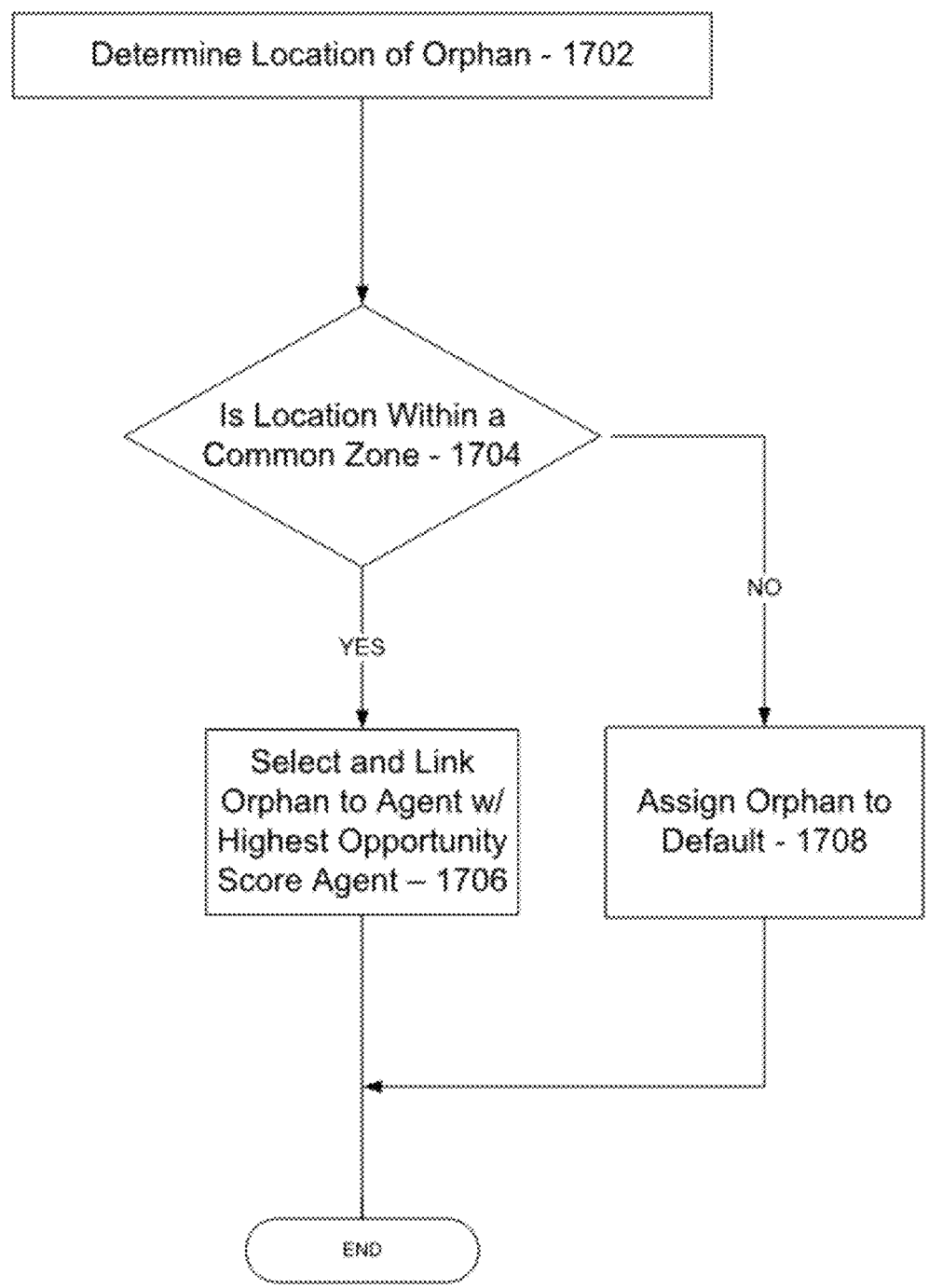

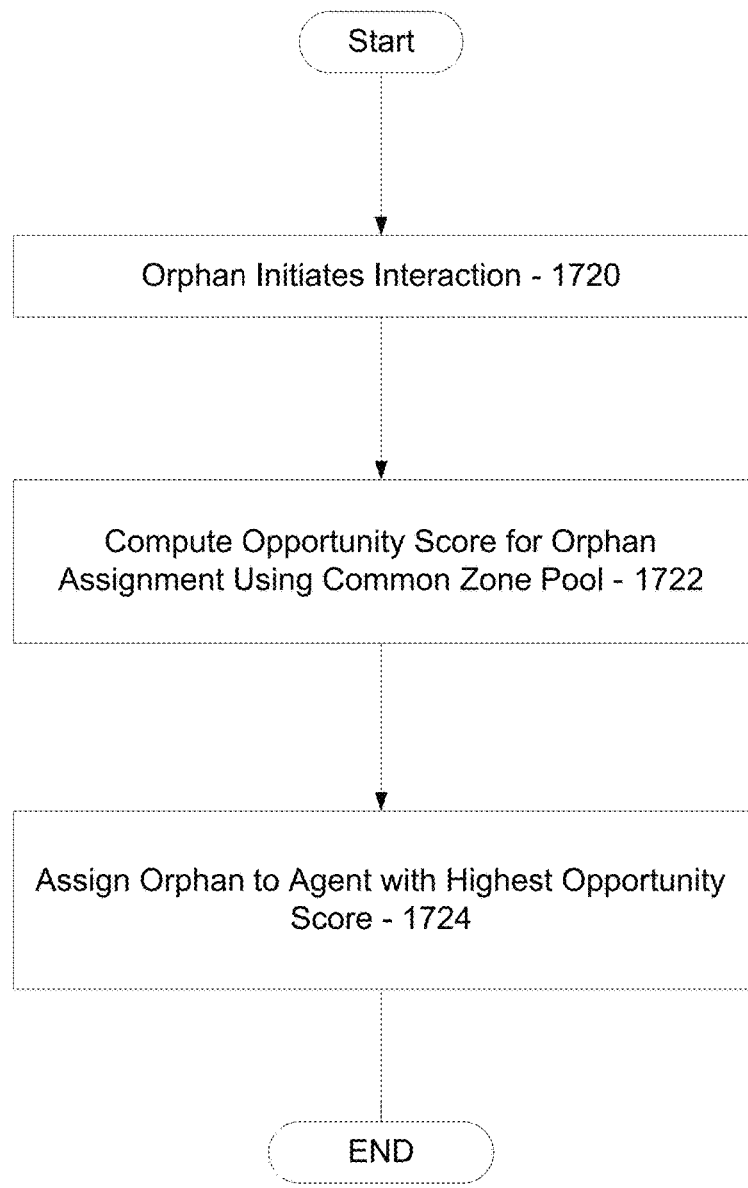

Figure 9 – Matrix Completion – Listing Event 1800
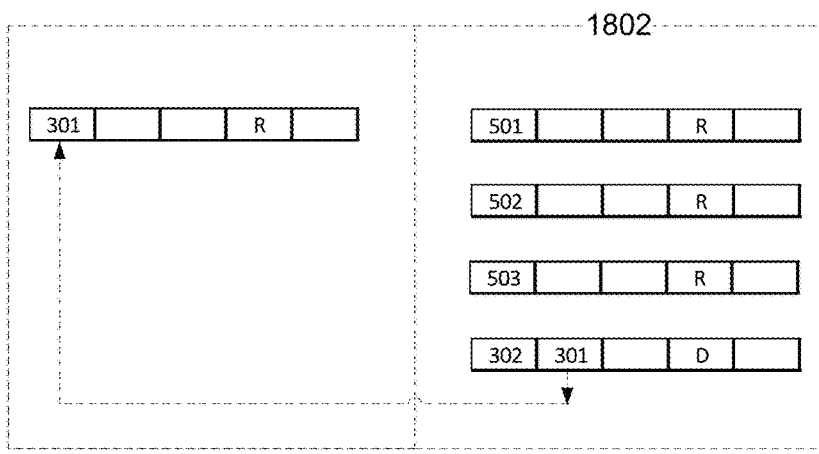
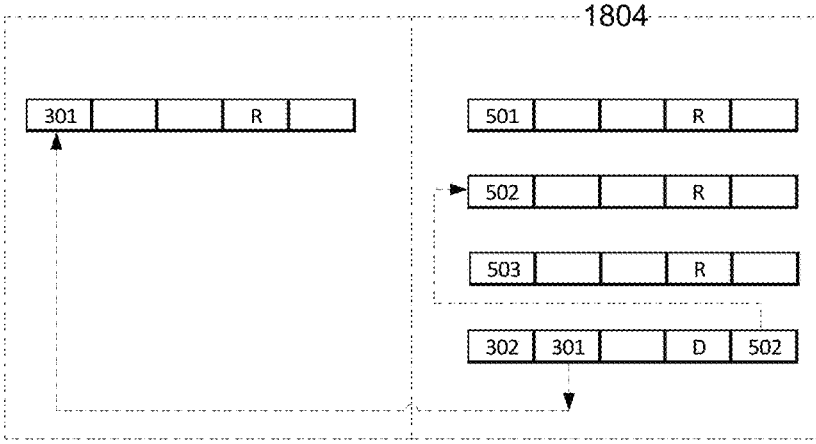

SYSTEM AND METHOD FOR HIERARCHICAL RELATIONSHIP MATRIX OPPORTUNITY SCORING

CROSS-REFERENCE TO RELATED APPLICATIONS his application claims the benefit of, and priority to U.S. provisional application 62/723,414 titled, "SYSTEM AND METHOD FOR HIERARCHICAL RELATIONSHIP MATRIX OPPORTUNITY SCORING" filed on Aug. 27, 2018, the entire specification of which is incorporated herein by reference.

BACKGROUND OF THE INVENTION

Field of the Art

The disclosure relates to the field of computing communication matrices, and more particularly to the field of computing communication matrices based on opportunity scoring.

Discussion of the State of the Art

Real estate brokers' income potential is limited by the marketing efforts of their respective companies (paid advertising, MLS membership, brand promotion, etc.) and the ability of their real estate agents to generate new sales. However, the consumers' choice of a real estate agent is fairly random and often based upon whatever agent is readily available to respond to an inquiry, regardless of who holds or is marketing the listing. This lack of stickiness equates to lost revenue.

The invention creates and preserves the connection between a real estate company's marketing and the consumer leads that it generates. Real estate agents register their current clients, and via their sphere of influence and social networking, the agents' registered new user base will be dramatically expanded well beyond the local geography. This new virtual territory and assignment platform will enable an agent to collect passive income for any of its registered users on a subsequent transaction, in any MLS administrative area in the nation in which there is a participating agent, income that they currently cannot claim. The social networking component of the invention expands the agents' marketing reach to a national level and likewise dramatically increases their income potential. The dynamics of the relationships generated, and their consequent outcomes are unmatched by any solution in the market today.

Moreover, with the invention's lead capture, and assignment platform, which includes artificial intelligence, a computer algorithm determines the most qualified agent to receive the lead or referral, i.e., the agent that is most likely to close the sale. The weighted attributes can be personalized by the broker to configure the system to reflect the broker's referral assignment preferences. This "smart" lead assignment ensures greater sales success and greater revenue for all participants, brokers and agents alike.

SUMMARY OF THE INVENTION

Accordingly, the inventor has conceived and reduced to practice, in a preferred embodiment of the invention, systems and methods for computing communication matrices based on opportunity scoring.

According to a preferred embodiment of the invention, a scoring algorithm may comprise the following parameters:
Client device time spent in communication with an agent device for example, cumulative time
Geographic location and distance between client device and agent device
Number of direct client devices associated to an agent device
Number of indirect client devices associated to an agent device
Quantity metrics associated to an agent device, for example, a total number of registrations
In some embodiments, other parameters may be added.
The equations associated with each of these parameters will be described below along with how they are weighted and combined into a final scoring value that may be used to determine a best match for the client device.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way.

FIG. 1 is a block diagram illustrating an opportunity scoring algorithm for a hierarchical relationship matrix;

FIG. 2 is a block diagram illustrating a matrix construction;

FIG. 2A is an illustration depicting a plurality of charts outlining a plurality of algorithmic results;

FIG. 3 is a flow diagram illustrating a method for computing a boundary zone;

FIG. 3A is a block diagram illustrating algorithmic zones;

FIG. 4 is a flow diagram illustrating a method for computing an opportunity score;

FIG. 5 is a block diagram illustrating a completion of a matrix;

FIG. 6 is a flow diagram illustrating an exemplary associative level matrix;

FIG. 7 is a flow diagram illustrating a method for detecting system gaming using a rate of influence;

FIG. 8 is a flow diagram illustrating a method for processing an orphan;

FIG. 8A is a flow diagram illustrating a method for an orphan assignment upon client-matrix interaction;

FIG. 9 is a block diagram illustrating a before and after of a completion of a matrix for a listing event for a direct client device which travels to a common zone which comprise a plurality of agent devices;

DETAILED DESCRIPTION

Figure 9A:
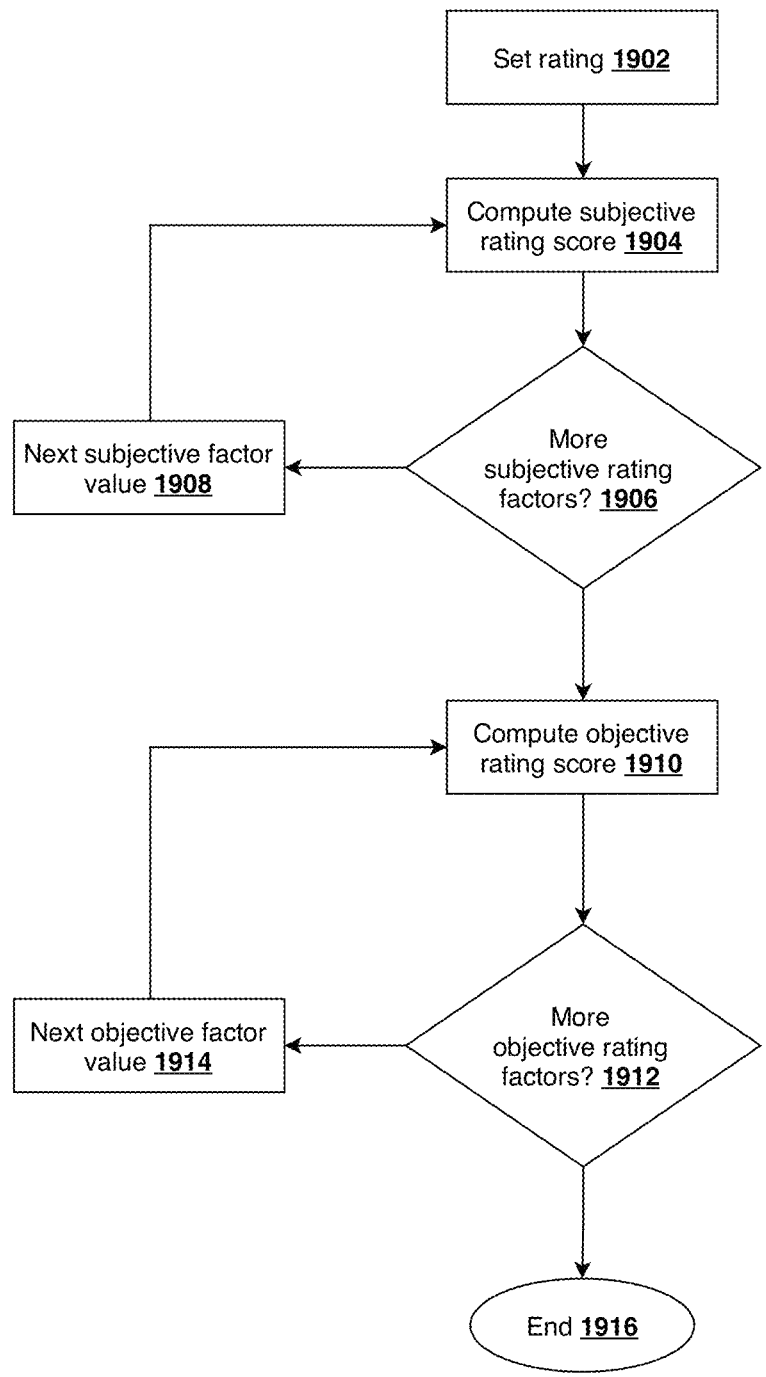
FIG. 9A is a flow diagram illustrating a method for a computation of a rating Score, according to an embodiment of the invention.

The inventor has conceived, and reduced to practice, systems and methods for hierarchical relationship matrix opportunity scoring.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 10:
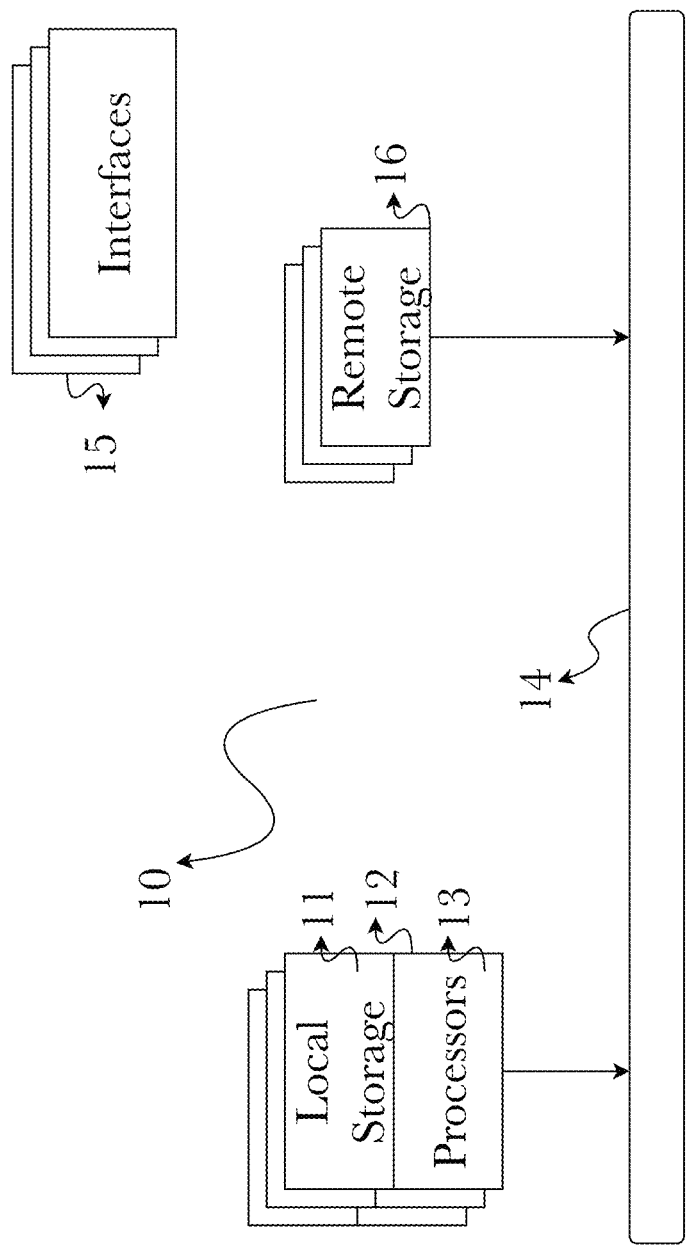
FIG. 10 is a block diagram illustrating an exemplary hardware architecture of a computing device used in an embodiment of the invention.

Referring now to FIG. 10, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 10 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 may handle communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 11:
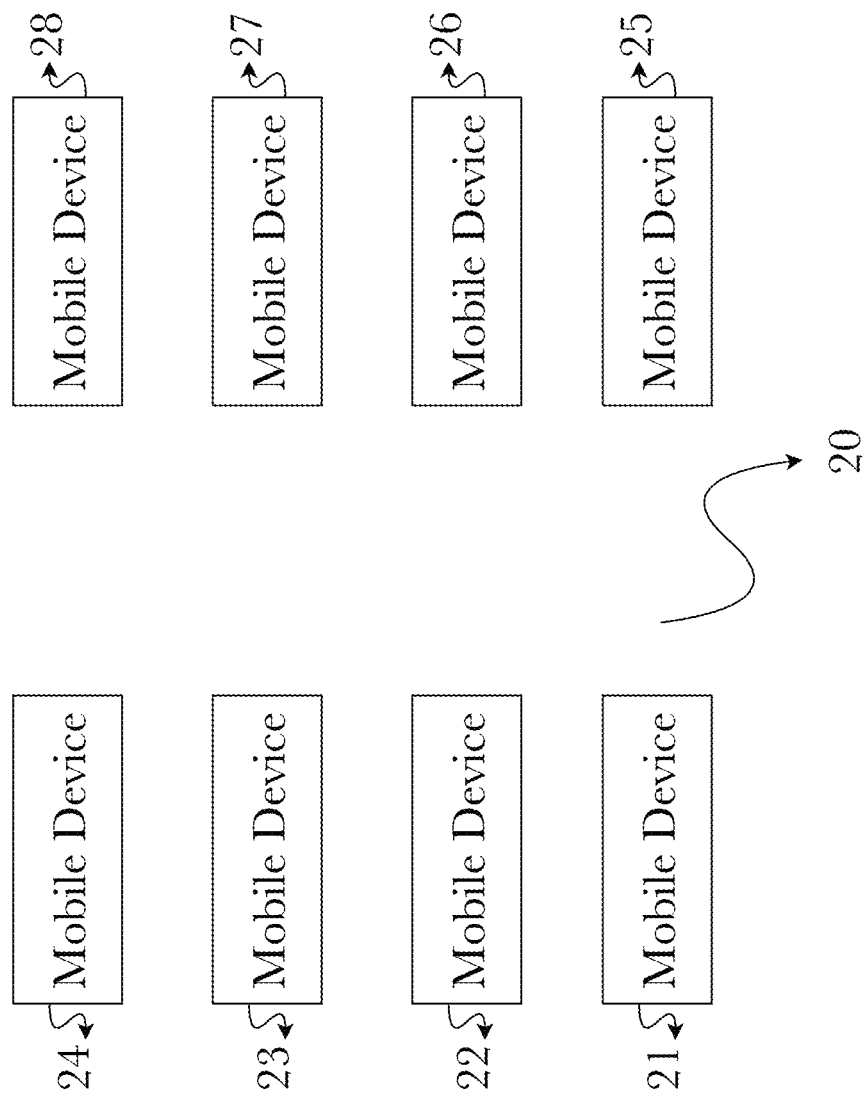
FIG. 11 is a block diagram illustrating an exemplary logical architecture for a client device, according to an embodiment of the invention.

In some embodiments, systems may be implemented on a standalone computing system. Referring now to FIG. 11, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20 and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 10). Examples of storage devices 26 include flash memory, magnetic hard drive, CD-ROM, and/or the like.

Figure 12:
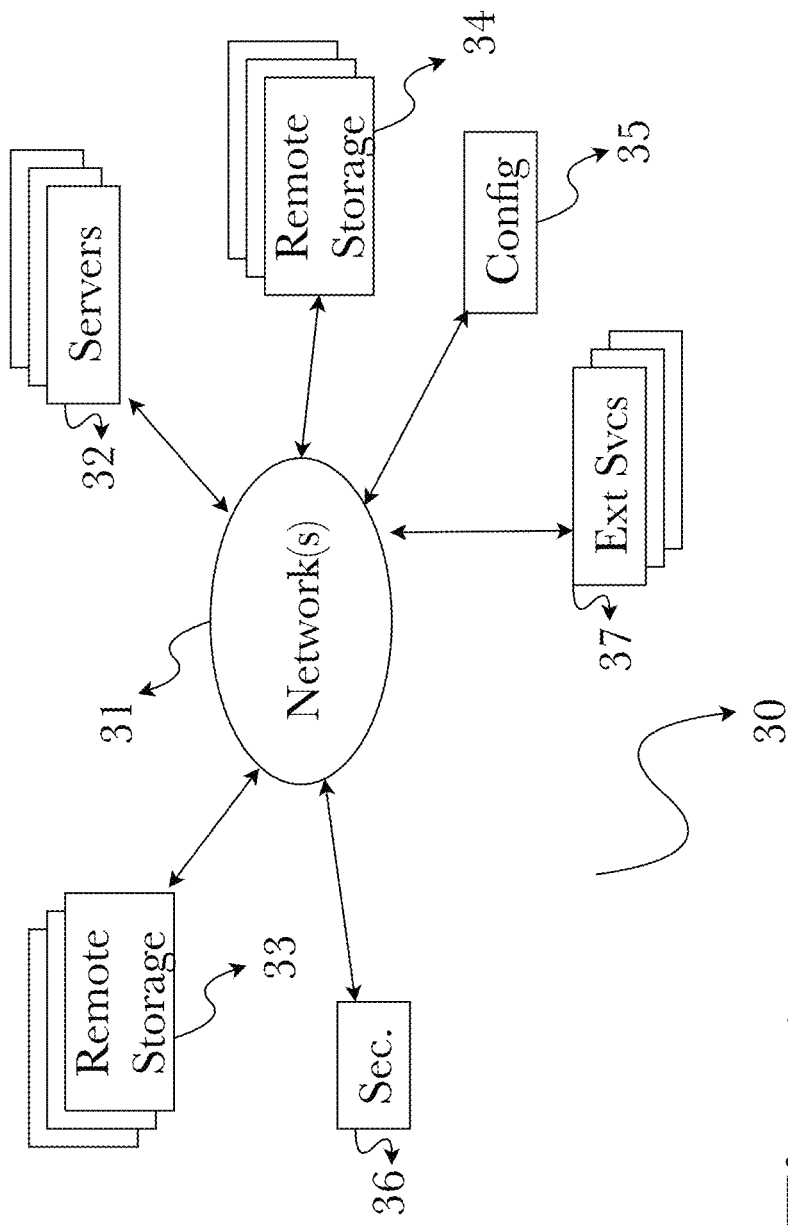
FIG. 12 is a block diagram showing an exemplary architectural arrangement of client devices, servers, and external services, according to an embodiment of the invention.

In some embodiments, systems may be implemented on a distributed computing network, such as one having any number of clients and/or servers. Referring now to FIG. 12, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 11. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as Wi-Fi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In some embodiments, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system.

Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation unless a specific security 36 or configuration system 35 or approach is specifically required by the description of any specific aspect.

Figure 13:
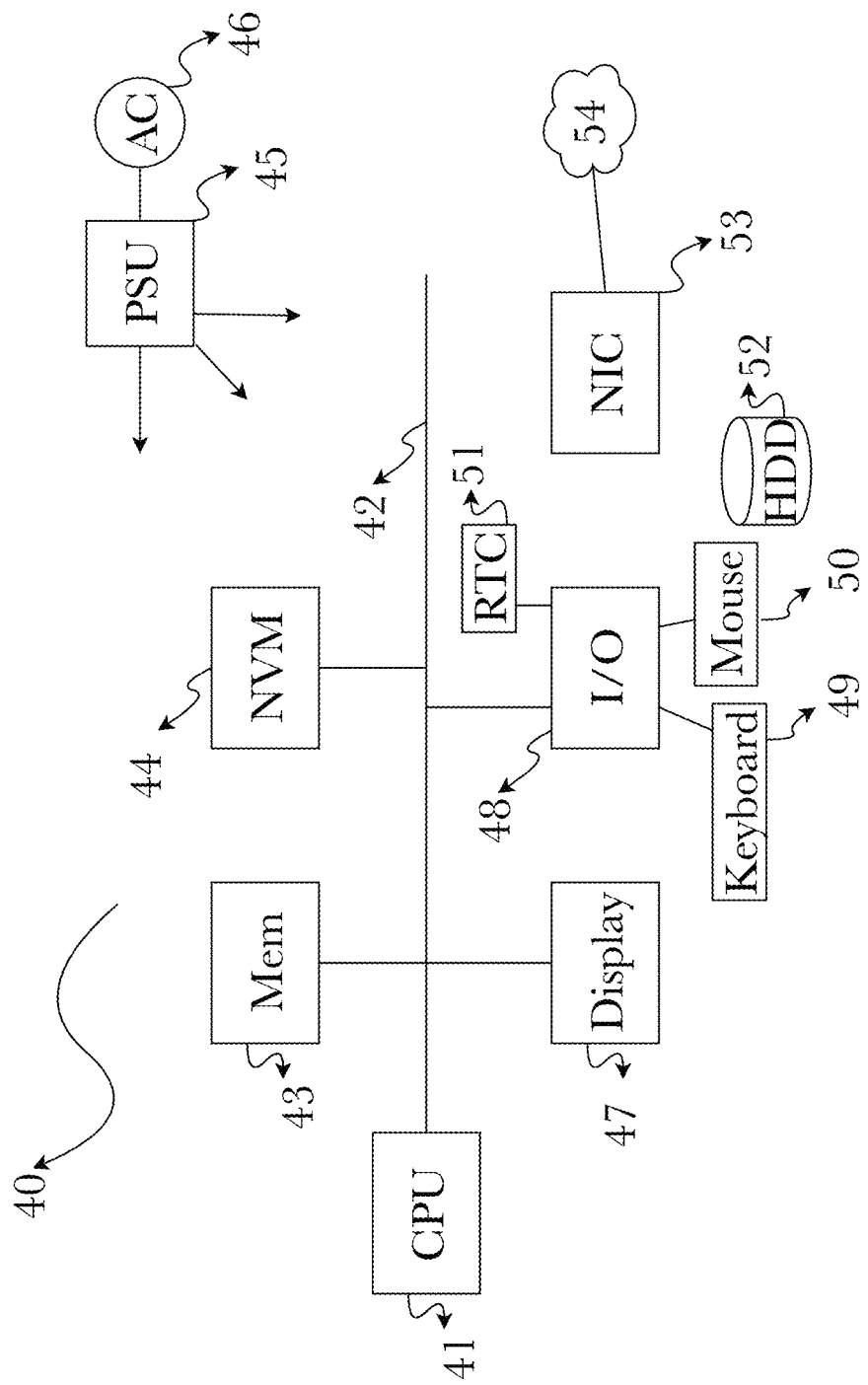
FIG. 13 is another block diagram illustrating an exemplary hardware architecture of a computing device used in various embodiments of the invention.

FIG. 13 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

DETAILED DESCRIPTION OF EXEMPLARY EMBODIMENTS

FIG. 1 is a block diagram illustrating an opportunity scoring algorithm for a hierarchical relationship matrix. According to the embodiment, a hierarchical tree-structure, hereinafter referred to as a matrix, is a structured set of linked nodes wherein each node representing an agent device or client device (direct or indirect). Nodes within the structure can be linked to other nodes in the structure.

All agent devices in the matrix that are within the common zone, see FIG. 3A, participate in the selection process to receive the connection, that is to complete the matrix. At least a portion of agent devices that have been selected in method 1200 may be used in a computation of a corresponding opportunity score based on interaction history. A highest scored agent device may be used to route future interactions.

Once a highest scored agent device has been selected, it may be communicatively linked to a client device within a common zone. Therefore, a link may exist between a parent agent device, a client device (direct or indirect) and an adopted agent device.

FIG. 2 is a block diagram illustrating a matrix construction, according to an embodiment of the invention. According to the embodiment, FIG. 2 depicts a construction, by matrix generator 2002, of a relationship matrix forming, for example, a hierarchical tree-like structure in which agent devices are top-level nodes, followed by direct client device nodes followed by one or more indirect client device nodes.

A top-level node of a plurality of top-level nodes, may be generated by assigning a unique ID and tagging them with a unique ID (for example, an "R") indicating they are at the top-level. In this case, 201 is the unique ID of this top-level node in the matrix.

A direct level node may be generated and assigned a unique ID (for example, a "D") indicating it is a direct level node. A link may then be placed in the direct node indicating that its parent is a top-level node 201. In this case, 202 is a direct node in the matrix.

Two Indirect nodes may be generated and assigned 203 and 204 and tagged with a unique ID (for example, an "I") indicating an indirect node. A link may then be placed in each indirect node indicating that its parent is direct node 202.

This may indicate two direct nodes being added to the top-level node. They may generate and assigned 205 and 206 and tagged with a unique ID (for example, "D") indicating they are direct nodes in the matrix. A link may be placed in each direct node to indicate that its parent is the top-level node 201.

In some embodiments, the above process may be repeated in the course of constructing the matrix, by matrix generator 2002, such that a plurality of nodes will be configured in the matrix. In some embodiments, once the matrix nodes are constructed and linked, their relationship are read-only and may not be destroyed.

Accordingly, the outlined systems and methods disclosed herein will offer significant improvements for location-based services with local devices associated to a specific geolocation are communicatively connected to provide services. For example, organization in a specific location may want interactions to be routed to and handled by devices in that location.

Embodiments of the present invention disclose systems and methods for providing agent device designation and communications routing. The system and method provide computed designation and routing of one or more client devices to one or more agent devices with device ancestry based on a type request and requirement involved in the transaction and/or preferences of the one or more client devices.

First, a pool of agent devices that are in the common areas may be identified. A designation and routing method may match up the one or more agent devices that match the one or more client device preferences and remote agent device with attribute preferences. The matching attributes may include, but not limited to, a baseline attributes of quality (cumulative usage), quantity (cumulative number of registrations) location, and the like. In some embodiments a plurality of eligible agent devices may be identified. The plurality of eligible agent devices may be determined by computing a match between the client device requirements and credentials associated to one or more agent devices. Another important aspect is a simultaneously gathering of data and browsing activity associated with the ancestry in the lineage of the devices in the matrix. Devices may be scored simultaneously and dynamically.

When the matrix is formed by matrix generator 2002, a minimum number of devices may be isolated (for example, three devices are isolated). For example, (i) an originating or referring device, (ii) a client device and (iii) a remote device. In some embodiments, many devices may be included in the ancestry of devices in the relationship matrix.

Although numerous algorithms are possible, in a preferred embodiment, a method by which client device preferences (for example, initially set up in the initial registration) match one or more agent device's abilities and skill sets. A major emphasis of the scoring may be focused on rewarding agent device associated with a best network outside of their configured location.

A method of scoring devices in a relationship matrix may also include tracking of data in a lineage and hierarchy of devices of each user device in the matrix. When a relationship matrix is formed, by matrix generator 2002, a snapshot of data and browsing activities associated with a plurality of devices in the ancestry and hierarchy of all linked devices. The relationship matrix may be formed or completed, by matrix generator 2002, when activity or a request is received from a client device. Simultaneously, at least a portion of browsing data and/or user data may be collected throughout an entire ancestry of devices that make up the relationship matrix Device types to score may include:
Score registered users via a native mobile app or AI embedded app
Score registered users via a unique website URL associated
Score registered users via a URL associated with an AI chatbot
Score registered users using a voice activated communication end point (for example, Amazon™ Alexa™)
Score registered user using a computing device
Score registered users using an electronic assistant application and/or device (for example, Google™ Personal Assistant)
Devices may include entry via a native app, a blog post, a website or any place a user may register. Devices may be scored regardless of its point of entry.

When action is received by a client device, methods described herein may be selected depending on an act by a client device. Further, a relationship may be formed and complete identities of all the devices may be established. A snapshot of browsing activity may take place and then the client device may be communicably enabled.

In some embodiments, building, forming and completing a relationship matrix, by matrix generator 2002, may comprise a plurality of steps, for example:

A matrix may be built, by matrix generator 2002, comprising a multi-level organizational structure. Capture and registration of a device, may function with a multilevel organizational structure. A multi-level structure comprising a relationship matrix may be built, by matrix generator 2002, and accommodate:
A first agent device may designate an unlimited number of associated other agent devices
An agent device may sponsor a first client device (for example, a direct client device associated to the agent device)
A first client device, of a plurality of agent devices, may sponsor others client devices (for example, and indirect client devices associated to the agent device).
A second client device (for example, and indirect client device), of the plurality of client devices, associated to the agent device may sponsor other client devices (for example, and indirect client device associated to agent device)

Action received from client device may be displayed in a display device, or displayed via a template on an AI chatbot or by instruction (for example, by voiced instruction) by client device, as selected by the client device, but not limited to, the following types of acts: a voice call, text message, chat session, ask the expert, email message, meeting request, acceptance via an electronic calendar, impromptu and immediate meeting request, such as the a schedule request, or vis' a vis' a chat box experience—data may be integrated with chatbot. Further, in some embodiments, a closing message from chatbot may display a template of several options, such as (i) a request to establish communication, (ii) type of communication, (iii) need to set up an calendar event, and the like. Client device may be an orphan and has gotten an invite to the system via a social media post or from directly loaded from an app store (Apple™, Android™) associated to client device.

Devices may be scored, by one or more scorers comprised in opportunity scorer 2003 and methods described herein may be employed and applied and may be dependent on the action received from the client device.

One or methods described herein may be executed for different actions received from client device depending on an action received from client device comprising any matching preference requirements or matches between the plurality of client devices, client device and/or remote device. In some embodiments, methods executed may be based on, for example, an amount of time a specific piece of information was reviewed by a client device. In this regard, a usage variable may be broken down from total usage to usage reviewing properties.

Assignment of device or devices. System described herein may communicably couple a client device to an action received from an agent device and ultimately to the device or devices. In the case of a question received from a the client device, a plurality of devices may be selected by matrix generator 2002. In some embodiments, methods described herein may be executed to provide, for example, a first agent device, 70% of interactions, a second agent device, 20%, and a third device agent device, 10%, etc.

In some embodiments, there may be a plurality of relationship matrixes formed, by matrix generator 2002, between a client device and a plurality of remote devices. For certain requests, where the algorithm may select, for example, three remote devices; there may be, for example, three simultaneously created relationship matrices.

In some embodiments, a client device may primarily determine an event and a time that a relationship matrix may be formed by matrix generator 2002. In some embodiments, scoring of devices may be based on a client device request and the relationship matrix may be completed, by matrix generator 2002, after or simultaneously while devices have been communicably connected.

Parameters considered by methods described herein may include, but not limited to, time of day, time, location, a location-based geographic distance between devices, number of devices registered and cumulative interaction time in each device. Each of these variables may increase or decrease dynamically and/or simultaneously. These activities all occur dynamically either larger or smaller and simultaneously. And each of the relationship matrix(s) may be formed, by matrix generator 2002, dynamically and/or simultaneously. In some embodiments, a use of presence management, by presence manager, may be implemented.

Methods described herein may utilize a plurality of dynamic attributes such as quality (cumulative usages of registered client devices), quantities (number of registered client devices each agent device may have registered), location, and the like.

In some embodiments, for example, if a certain type of request (for example, ask the expert) is received from a client device is, then methods described herein may also factor in credentials and years of experience associated to the device holder. For example, see ask the expert chart below.

In some embodiments, if a certain type of request is received (for example, for a scheduling event), then methods described herein may factor in a proximity of devices closest to the client device (for example, based on location information received from the device) as well as presence management. For example, see impromptu appointment below.

In some embodiment, if a request to establish a communication with another device based on skill (for example, language) is received from client device, then the processor may include a language variable. See method for language preference below.

In some embodiments, matrix generator 2002 may capture, track and extract data points and browsing history associated with a lineage of each client device comprised within the matrix; from the referring device (its origin including location, product and browsing history, etc.).

Methods described herein may be used for a plurality of devices associated to clients and agents in a referral network, for example, a real estate vertical.

In some embodiments, a number of registrations and other data may be received from one or more client devices who may be in a similar geographic location as an agent device. An amount of interaction time may be recorded, by opportunity scorer 2003, unless the interaction is from an (ancestral lineage) direct or indirect client device of the user.

A value of the relationship matrix formed based on interactions may be that a regional or national organization may instantly obtain a common ancestry of at least a portion of devices in an associated relationship matrix (comprising originating device, client devices and/or remote devices).

In some embodiments, key devices in a relationship matrix may include an originating or referring device, one or more client devices (direct and indirect), and a remote device.

Devices that may be scored, by opportunity scorer 2003, in a relationship matrix may comprise user devices and client devices.

In some embodiments, opportunity scorer 2003 may score a device based on a score associated to user devices in a relationship matrix and may be used to identify devices who are designated as most qualified to answer questions originating from a client device.

An objective of opportunity scorer 2003 may be to score devices to complete a relationship matrix in a referral network environment. Accordingly, devices may be scored to isolate a device with a high number of successful interactions, or transactions, or are associated to a particular skill set. for example, in a referral network (or a relationship matrix), a completion or formation of a relationship matrix may be desired. In some embodiments, a completion of a relationship matrix may be formed, by matrix generator 2002, between devices when action is received from client device.

The following may be events that may cause a client device to act; thus, requiring the scoring of devices previously to assigning a transaction. For example:

A request is received, at interaction manager 1901, from a client device requesting a voice communication with an agent device;

A request is received, at interaction manager 1901, from a client device requesting a chat session with an agent device;

When a request is received, at interaction manager 1901, from a client device, for example, an "ask the expert" comprised within an email message;

When a calendar request is received, at interaction manager 1901, from a client device, interaction manager 2001 may automatically calendar an appointment;

When a request is received, at interaction manager 1901, from client device requesting to establish an electronic communication;

An interaction is received, at interaction manager 1901, from an AI-based chatbot session.

In a preferred embodiment, multiple simultaneously created relationship matrices may be formed with a single client device associated to multiple agent devices.

In some embodiments, opportunity scorer 2003 may optimize a matrix such that a device with a high number of successful interactions/transactions is identified and thus is assigned, by opportunity scorer 2003, a client device opportunity.

In some embodiments, interaction manager 2001 may bring together agent device and client device at a time an interaction is received from client device.

Systems and methods disclosed herein present comprise an opportunity scorer operable to receive interactions form one or more client device, route them to agent devices and reward the agent devices that are designated as most qualified to address the nature of the interaction and positioning the associated agent devices to receive future interactions associated to the client devices. In a business embodiment, this may translate to additional business routed to the agent device.

The opportunity scorer 2003 may simultaneously compute device scores, form or complete a relationship matrix (in real-time, or in other embodiments, at defined times n the execution of the system), and enable communication between devices at the time the an interaction is received from client device.

In the ask the expert scenario; a complex arrangement may be processed by completing a plurality of scores simultaneously.

In some embodiments, an interaction (for example, comprising a question) may be received from client devices whereby systems and methods disclosed herein may direct the questions to agent devices whose profile indicate that they are most qualified; further, systems and methods disclosed herein may store responses into a database so that the next time that a similar interaction is received, a similar response pattern may be employed. In this regard, agent device who routed the interaction (for example, to another agent device) as well offer the winning agent device the question; provided that the interaction, in some embodiment corresponds to skills associated with the another agent device.

Some bots known in the art may have difficulty in automatically addressing an interaction (for example, answer a question comprised within the interaction) accurately. Accordingly, the interaction may be directed to an agent device to provide a supervised response (that is, supervised by another agent device) in real-time. In this regard, the chatbot detects and identifies a requirement for the interaction being asked (for example, identifies a question).

In an exemplary embodiment, in the art of mortgage financing where methods disclosed herein may comprise a device with skills in mortgage, or in another exemplary embodiment in the art of legal support (for example, a device associated with a user skilled in title transactions), and so on. In this regard, methods disclosed herein may consider devices associated with specific skills (for example, users associated to a particular professional and/or in an associated verticals).

In some embodiments, opportunity scorer 2003 may score devices when an interaction is received from a client device. Further, opportunity scorer 2003 may factor and associate a type of activity of the client device request.

Opportunity scorer 2003 may utilize methods disclosed herein to complete a relationship matrix comprising a most qualified device. A relationship matrix may be created via registered devices that may be dynamically linked.

In some embodiments, initial variables may include a total number of devices registered, average usage of each device and location of devices. Dynamic client device growth and app usage statistics (for example, averages), location, another metric, and whereby computations may happen simultaneously. There is no control over when these events are taking place. Client devices may have total control over methods described herein while they are being performed. Ultimately when a change in scoring, by opportunity scorer 2003, takes place. Changes may be realized through methods described herein.

Other variables may be considered by opportunity. For example:
  Cumulative time used by each client device in application usages
  A total number of registered client devices (both direct and indirect devices)
  Device location
  Weighting; for example, a direct client device is weighted higher than indirect client devices.

With additional variables, scoring may be adapted between devices to provide a higher variance. Variables used to score devices may include years of experience and or enhanced credentials such as, in a real-estate embodiment, a broker in real estate. Another location variable may be the amount of time a device may have been reviewing a product (for example, a home in the case of real estate embodiment) from an information source (for example, a web site), in a particular, a geolocation such as zip code or neighborhood. Another variable may be a price range of a home or a home-style (for example, Victorian, Tudor, loft, etc.) whereas one device is reviewing properties in a certain price range or reviewing property profiles with a particular home style. These variables are available for selection at the time of registration.

A second scoring system aka "ask the expert" may provide a client device an opportunity to create an interaction comprising a question in an attempt to have them answered by the most qualified and, in some embodiments, a device associated with a work profile (for example, hardest working) in an associated skill area. In the ask the expert scenario, a plurality of relationship matrixes may be simultaneously created, by matrix generator 2002. In this regard, several variables may be added to methods described herein such as credentials (i.e., a broker) and length of time associated with those credentials.

In some embodiments, opportunity scorer 2003 may score client devices to reward client devices for a level of participation.

In some embodiments, predictive analytics for the likelihood of a communication attempt by a client device may considered.

In some embodiments, identifying and weighing devices differently that are "gaming the system." Whereby gaming the system may comprise an interaction behavior, by a device, that indicates as using rules and procedures meant to protect a system to, instead, manipulate the system for a desired outcome.

In some embodiments, an AI chatbot where the chatbot places a template in front of the user with several acts may be employed.

FIG. 3 is a flow diagram illustrating a method for computing a boundary zone. The boundary zone algorithm depicted in FIG. 3 may describe an iterative process whereby a sufficient number of agent devices may be included in an opportunity pool obtained from a common zone. The boundary zone may be increased to select a sufficient number of agent devices for the pool.

Compute the boundary area (i.e. the incremental distance describing the width and height of the bounded area under consideration).

Collect all agent devices within the common zone (i.e., agent devices having common geographical area which they serve or represent).

Compute the actual boundary area relative to the activity zone (i.e., the area of interest where the client device is focusing).

Compare the agent device location to the boundary zone. If the agent device is not within the boundary zone, then continue to step 1204 for the next agent device in the common zone, if the agent device is within the boundary zone then continue to step 1205.

Add the agent device id to the opportunity pool (i.e., the collection of agent devices that have a potential to receive an opportunity in step 1400. If additional agent devices remain in the common zone, return to step 1204, else go to step 1206.

Compare the number of agent devices in the opportunity pool to the minimum acceptable number. If the minimum has not been reached, in some embodiments, then a boundary area may be widened and proceed to step 1201.

FIG. 3A is a block diagram illustrating algorithmic zones; the zones allow the selection of a qualified agent device and a completion of a matrix.

A common zone may include all the agent devices that share a common attribute and are potentially qualified to receive an interaction and subsequent connection to a requesting device.

A boundary zone may be determined by the minimum size of an opportunity pool in step 1205 which may contain a sufficient number of agent device. The boundary zone may be bigger or smaller than the activity zone but may always, in some embodiments, be within the common zone.

An activity zone may be a result of activity of the client device at a location or given area. The activity zone may be bigger or smaller than the boundary zone but may always, in some embodiments, be within the common zone.

FIG. 4 is a flow diagram illustrating a method for computing an opportunity score. The method may compute each agent device's opportunity score when a client device causes a completion event (that is, an interaction indicating a completion of an activity).

In some embodiments, one or more connections to at least a portion of agent devices may be received from the opportunity pool constructed in method 1200. Each of these agent devices may be initially qualified to receive a connection.

The reach factor score may be based upon a binary factor, the reach (i.e. distance) between agent device in the opportunity pool and an associated activity zone and a reach factor weight. An exemplary a computation for two agent devices may be as follows:

For Agent device 1: RF1=(Binary Factor)/(Reach Factor for Agent device 1) For Agent device 2: RF2=(Binary Factor)/(Reach Factor for Agent device 2)

Total Reach Factor=RF1+RF2

For Agent device 1: RFS1=(Reach Factor Weight)×RF1/(Total Reach Factor) For Agent device 2: RFS2=(Reach Factor Weight)×RF2/(Total Reach Factor)

A time factor score (TFS), calculated by time scorer 2005, may be based upon the binary factor, the amount of time the agent device's direct and indirect, as calculated by direct scorer 2006 and indirect scorer 2007 respectively, client devices spent on the designated primary activity and the time factor weight. An exemplary computation for two agent devices may be as follows:

For Agent device 1: TF1=(Binary Factor)×Time Factor×(sum of all Direct and Indirect Client devices) For Agent device 2: TF1=(Binary Factor)×Time Factor×(sum of all Direct and Indirect Client devices)

Total Time Factor=TF1+TF2

For Agent device 1: TFS1=(Time Factor Weight)×TF1/(Total Time Factor) For Agent device 2: TFS2=(Time Factor Weight)×TF2/(Total Time Factor)

A direct factor score (DFS), calculated by direct scorer 2006, may be based upon the binary factor, the number of direct client devices for each agent device and the direct factor weight. An exemplary computation for two agent devices may be as follow:

For Agent device 1: DF1=(Binary Factor)×(sum of all Direct Client devices for Agent device 1) For Agent device 2: DF2=(Binary Factor)×(sum of all Direct Client devices for Agent device 2)

Total Direct Factor=DF1+DF2

For Agent device 1: DFS1=(Direct Factor Weight)×DF1/(Total Direct Factor) For Agent device 2: DFS2=(Direct Factor Weight)×DF2/(Total Direct Factor)

An indirect factor score (IFS), calculated by indirect scorer 2007, may be based upon the binary factor, the number of indirect client devices for each agent device and the indirect factor weight. An exemplary computation for two agent devices may be as follow:

For Agent device 1: IF1=(Binary Factor)×(sum of all Indirect Client devices for Agent device 1) For Agent device 2: IF2=(Binary Factor)×(sum of all Indirect Client devices for Agent device 2)

Total Indirect Factor=IF1+IF2

For Agent device 1: IFS1=(Indirect Factor Weight)×IF1/(Total Indirect Factor) For Agent device 2: IFS2=(Indirect Factor Weight)×IF1/(Total Indirect Factor)

A quantity factor score (QFS), by quantity factor calculator 2008, may be based upon the binary factor, the quantity factor for each agent device and the quantity factor weight. An exemplary computation, by quantity factor calculator 2008, for two (2) agent devices may be as follows:

For Agent device 1: QF1=(Binary Factor)×(Quantity Factor for Agent device 1) For Agent device 2: QF2=(Binary Factor)×(Quantity Factor for Agent device 2)

Total Quantity Factor=QF1+QF2

For Agent device 1: QFS1=(Quantity Factor Weight)×QF1/(Total Quantity Factor) For Agent device 2: QFS2=(Quantity Factor Weight)×QF1/(Total Quantity Factor)

In some embodiments, a computation of a cumulative opportunity score for each agent device in an opportunity pool may select an agent device with the highest numerical score. An exemplary computation for two agent devices may be as follows:

Opportunity Score for Agent device 1: S=RFS1+TFS1+DFS1+IFS1+QFS1 Opportunity Score for Agent device 2: S=RFS2+TFS2+DFS2+IFS2+QFS2

FIG. 5 is a block diagram illustrating a completion of a matrix. Accordingly, a before and after the completion of a matrix, by matrix generator 2002, for a direct client device 301 which may be geographically located in a common zone 2 which may comprise two agent devices 401 and 402.

A completion of the matrix, by matrix generator 2002, may be triggered when a completion event occurs (that is an interaction indicating completion of a transaction) within the matrix. A direct or indirect node may cause the matrix to be completed. For example, consider a matrix 1402 having been constructed. Direct client device 302 may be linked to agent device 301. Direct client device 302 may be associated with agent device 301 regardless of activity. For example, assume that a geographic location associated with direct client device 302 in a common zone and then causes a completion event.

A matrix before the completion event occurs. In an exemplary embodiment, there may be two (2) agent devices, agent device 401 and agent device 402, within the common zone to which the direct client device 302 may be associated during a completion event.

When a completion event occurs, direct client device 302 may become associated with at least one agent devices in the common zone which may have been determined by a relative strength based on a respective opportunity score.

The matrix after the completion event. Direct client device 302 may be linked or associated to agent device with a highest opportunity score, in this case, agent device 401.

FIG. 6 is a flow diagram illustrating an exemplary associative level matrix. According to the embodiment, a top-level node of a plurality of nodes, may be generated by assigning, by matrix generator 2002, a unique ID and tagging them with a 'R' indicating they are at the top-level. In this case, 250 is the unique ID of this top-level node in the Matrix.

A top-level associative node is generated and is assigned a unique ID and tagged (for example, with a "R"), by matrix generator 2002, indicating it is a top-level node. A link may then be placed in the associative node indicating that it is associated with another top-level node 250. In this case, 251 is an associative node in the Matrix.

FIG. 7 is a flow diagram illustrating a method for detecting system gaming using a rate of influence; compute the average rate of influence (AROI) in the common zone for all nodes at level K by using the following algorithm:

$$AROI=[\text{Number of Nodes at level } K+1]/[\text{Number of Nodes at Level } K+2]$$

Compute the Rate of Influence (ROI) for a specified node a level K by using the formula:

$$ROI=[\text{Number of Nodes at level } K+1]/[\text{Number of Nodes at Level } K+2]$$

Compute the upper and lower spread limits for level K as follows:

Upper Spread Limit=(1+Upper Spread Value]*AROI

Lower Spread Limit=[1+Lower Spread Value]*AROI

Compare ROI to the upper and lower spread limits. If the ROI is less than the lower spread limit, the algorithm accepts the node and attaches the node to the matrix. If the ROI is within the upper and lower spread limits, the node is accepted and attached to the matrix. If the ROI is greater than the upper spread limit, the node is considered "gaming" and is rejected by the matrix.

"Gaming detection" may be activated when the ROI is greater than the normal range for rate of influence for a specified node at level K.

When ROI is within the normal range for ROIs, the node will be accepted, by matrix generator 2002, and added to the matrix.

FIG. 8 is a flow diagram illustrating a method for processing an orphan device. According to the embodiment, a determination of a location of an orphan client device or their associated geographic area of interest. In a first step 1702, the orphan client device's geographic location may be determined by physical address, zip code, city or area of the client. In a next step, 1704, a determination if a location associated to the orphan client device that may be located within the common zone area is made. In a next step 1706, if the orphan client device is within a common zone area, then assign that orphan client device to an associated common pool. In a next step 1708, if the orphan client device is outside of common zone areas, then the orphan client device is assigned to a default common pool of agent devices.

The orphan client device may remain in the common zone or default pool until an interaction occurs between the orphan client device and the matrix.

FIG. 8A is a flow diagram illustrating a method for an orphan client device assignment upon a client-matrix interaction. When an interaction occurs between an orphan client device and the matrix, an assignment of the orphan client to a specific agent will occur and the orphan client device will be fully registered in the matrix, by matrix generator 2002. In a first step 1720, an orphan client device may initiate an interaction with the matrix. In a next step 1722, a computation, by opportunity scorer 2003, of an orphan client device opportunity score using an opportunity pool of agent devices and factors associated with the orphan client device opportunity assignment score. In a next step 1724, assignment of an orphan client device to a highest orphan opportunity score, by opportunity scorer 2003 agent device within the opportunity pool for orphan client devices.

FIG. 9 is a block diagram illustrating a before and after of a completion of a matrix for a listing event for a direct client device whose geographic location changes to a common zone that may comprise a plurality of agent devices. According to the embodiment, the before and after the completion of the matrix for a listing event for a direct client device 302 which may change geographic location to a common zone may comprise three agent devices (501, 502 and 503) and may be triggered when then completion event (i.e. an interaction) occurs within the matrix, by matrix generator 2002. A direct or indirect node may cause the matrix to be completed. For example, consider matrix 1802 has been constructed, by matrix generator 2002. The direct client device 302 may be linked to the agent device 301. Direct client device 302 may be associated with agent device 301 regardless of any associated interactions. For example, assume that direct 302 changes geographic location to the common zone and then causes the completion event.

In an exemplary embodiment, the matrix, before the completion event occurs, may comprise three agent devices 501, 502 and 503 within the common zone whereby the direct client device 302 may select and become linked during a completion event. When the completion event (i.e. an interaction) occurs, the direct client device 302 may become associated with one of the agent devices in the common zone which may have been determined by a relative strength of their respective opportunity scores, as calculated by opportunity scorer 2003.

The matrix after the completion event. Direct client device 302 may become linked or associated, by matrix generator 2002, to one of the agent devices with a high-ranking opportunity score within the common zone, in this case, agent device 502.

FIG. 9A is a flow diagram illustrating a method for a computation of a rating score, according to an embodiment of the invention. Method 1900 begins in a first step 1902, whereby a rating score (RS) is initialized to zero. In a next step 1904, a rating score (RS) is computed where RS=SW*SR+RS and SW is the weight associated with this rating factor; SR is the rating value associated with this rating factor. For example, a subjective rating may be a score of 1 to 5 selected by a user. In a next step 1906, a determination of if there may be more subjective rating factors to be included in the computation. If more factors, then proceed to step 1908; otherwise proceed to step 1910. In step 1908, the next subjective rating factor values are used and proceed step 1904, to add to the rating score. If finished with subjective rating factors, then proceed to step 1910. In step 1910, a rating score (RS) for objective ratings is computed where RS=SO*OR+RS and OW is the weight associated with this objective rating factor; and OR is a computed value from data analysis. For example, an objective rating may be the number of units sold. In a next step 1912, a determination of if there more objective rating factors to be included in the computation is made. If more factors, the proceed to step 1914, otherwise proceed to step 1916. In step 1914, the next objective rating factor values may be used, then return to step 1910 to add to the rating score. In step 1916 computation is complete.

Total client device time spent of a given activity may be calculated, by time scorer 2005, as follows:

$$T_i = \Sigma_{j=0}^{P} t_j + \Sigma_{k=0}^{S} t_k$$

whereby:

$T_i$=The total client device time spent on the given activity by all direct and indirect client devices of agent device$_i$ $t_j$=the time that direct client devices spent on the given activity P=the number of direct client devices that agent device$_i$ has $t_k$=the time that indirect client device$_k$ spent on the given activity S=the number of indirect client devices that agent device$_i$ has Accordingly, an amount of time each direct client device of agent device$_i$ is added together to get a total and the same is done for the indirect client devices of agent device$_i$ to get the total amount of time spent on the given activity The scoring factor for a client device time for agent device$_i$ may be calculated, by time scorer 2005, as follows:

$$F1_i = W_1 * (T_i / \Sigma_{n=0}^{M} T_n) * 100 * B_i$$

Where this means the following:

$F1_i$=the scoring factor for Client device Time for agent device$_i$ $W_1$=the weighting factor used to determine the importance of Client device Time as a parameter relative to the other parameters on a 1-100 scale $T_i$=the total client device time spent on the given activity by all direct and indirect client devices of agent device$_i$ M=the total number of agent devices in the common zone, i.e., potential agent devices for assignment to this opportunity $(T_i/\Sigma_{n=0}^{M} T_n)$=the fraction of the total time client devices of agent device$_i$ spent on the given activity compared to total client device time spent on the given activity across all direct and indirect client devices of all of the agent devices in the common zone.

$B_i$=a binary factor for agent device$_i$ that is 1 if the agent device meets all of the eligibility criteria for the opportunity and is 0 if the agent device fails to meet any of the criteria, e.g., if Spanish language capability is required for the opportunity and the agent device does not speak Spanish, this would be set to 0 and the agent device would not be considered for this opportunity.

Reach Factor may be calculated, by reach scorer 2004, as follows:

$$R_i = 1/D_j$$

where this means the following:

$R_i$=The value that measure the reach for agent device$_i$ $D_j$=the physical reach between client device$_j$ and agent device$_i$ So, the reach value is inversely proportional to the physical reach between the parties The scoring factor for client device time for agent device, may be calculated, by time scorer 2005, as follows:

$$F2_i = W_2 * (R_i/\Sigma_{n=0}^{M} R_n) * 100 * B_i$$

Whereby:

$F2_i$=the scoring factor for Reach for agent device$_i$ $W_2$=the weighting factor used to determine the importance of reach as a parameter relative to the other parameters on a 1-100 scale $R_i$=the value that measure the reach for agent device$_i$ M=the total number of agent devices in the Common Zone, i.e., potential agent devices for assignment to this opportunity $(R_i/\Sigma_{n=0}^{M} R_n)$=the reach factor for agent device$_i$ as a fraction of the sum of the reach factors of all agent devices in the common zone $B_i$=a binary factor for agent device$_i$ that is 1 if the agent device meets all of the eligibility criteria for the opportunity and is 0 if the agent device fails to meet any of the criteria, e.g., if Spanish language capability is required for the opportunity and the agent device does not speak Spanish, this would be set to 0 and the agent device would not be considered for this opportunity.

Direct client device factor may be calculated, by direct scorer 2006, as follows:

$$F3_i = W_3 * (DC_i/\Sigma_{n=0}^{M} DC_n) * 100 * B_i$$

Whereby:

$F3_i$=the scoring factor for direct client devices for agent device$_i$ $W_3$=the weighting factor used to determine the importance of direct client device factor as a parameter relative to the other parameters on a 1-100 scale $DC_i$=the number of direct client devices registered to agent device$_i$ M=the total number of agent devices in the common zone, i.e., potential agent devices for assignment to this opportunity $(DC_i/\Sigma_{n=0}^{M} DC_n)$=the number of direct client devices registered to agent device$_i$ as a fraction of the total number of direct client devices registered to all agent devices in the common zone $B_i$=a binary factor for agent device$_i$ that is 1 if the agent device meets all of the eligibility criteria for the opportunity and is 0 if the agent device fails to meet any of the criteria, e.g., if Spanish language capability is required for the opportunity and the agent device does not speak Spanish, this would be set to 0 and the agent device would not be considered for this opportunity.

Indirect client device Factor is calculated as follows:

$$F4_i = W_4 * (IDC_i/\Sigma_{n=0}^{M} IDC_n) * 100 * B_i$$

Whereby:

$F4_i$=the scoring factor for direct client devices for agent device$_i$ $W_4$=the weighting factor used to determine the importance of indirect client device Factor as a parameter relative to the other parameters on a 1-100 scale $IDC_i$=The number of indirect client devices registered to agent device$_i$ M=the total number of agent devices in the common zone, i.e., potential agent devices for assignment to this opportunity $(IDC_i/\Sigma_{n=0}^{M} IDC_n)$=the number of indirect client devices registered to agent device$_i$ as a fraction of the total number of indirect client devices registered to all agent devices in the common zone $B_i$=a binary factor for agent device$_i$ that is 1 if the agent device meets all of the eligibility criteria for the opportunity and is 0 if the agent device fails to meet any of the criteria, e.g., if Spanish language capability is required for the opportunity and the agent device does not speak Spanish, this would be set to 0 and the agent device would not be considered for this opportunity.

A quantity factor may be calculated, by quantity factor calculator 2008, as follows:

$$F5_i = W_5 * (Q_i/\Sigma_{n=0}^{M} Q_n) * 100 * B_i$$

Where this means the following:

$F3_i$=the scoring factor for quantity for agent device$_i$ $W_5$=the weighting factor used to determine the importance of quantity as a parameter relative to the other parameters on a 1-100 scale $Q_i$=the value of the quantity metric for agent device$_i$ M=the total number of agent devices in the Common Zone, i.e., potential agent devices for assignment to this opportunity $(Q_i/\Sigma_{n=0}^{M} Q_n)$=the value of the quantity metric for agent device$_i$ as a fraction of the sum of the quantity metrics for all agent devices in the common zone $B_i$=a binary factor for agent device$_i$ that is 1 if the agent device meets all of the eligibility criteria for the opportunity and is 0 if the agent device fails to meet any of the criteria, e.g., if Spanish language capability is required for the opportunity and the agent device does not speak Spanish, this would be set to 0 and the agent device would not be considered for this opportunity.

The total agent device score is simply the sum of the weighted scores of each of the parameters. In a basic case, that is:

$$AS_i = F1_i + F2_i + F3_i + F4 + F5_i$$

Whereby:
AS$_i$=Total score for agent device$_i$
F1$_i$=Client device Time Factor score for agent device$_i$
F2$_i$=Reach Factor score for agent device$_i$
F3$_i$=Direct Client device Factor score for agent device$_i$
F4=Indirect Client device Factor score for agent device$_i$
F5$_i$=Quantity Factor score for agent device$_i$ The scores for at least a portion of the agent devices in the common zone are calculated and the opportunity is awarded to the agent device with the greatest total score.

In some embodiments, systems described herein may comprise a plurality of default baseline data points for computer algorithms include:

For example:
(i) quantity of registrations
(ii) usages—a cumulative average time spent in the apps of registered client devices
(iii) location
(iv) average consumer ratings
(v) an average price of a home either listed or sold by the real estate agent device matching up with the homes that the client device has reviewed or in the event the consumer wants to list their home, an agent device would be selected that is associated with the most experience with homes that were in the price range of the consumers selection.

Both (iv) and (v) may be dynamic variables and can change hourly, daily, especially the consumer/client ratings average.

Both (iv) and (v) may be dynamic variables and can change hourly, daily, and especially the agent device ratings. will vary because in the beginning none of the agent devices will have any ratings or sales volume of homes in the price range of the consumer.

In a real-estate embodiment of the invention, it may be advantageous for a request (via an interaction) originating from a client device to be assigned an agent device that is associated with, for example, either selling or listing homes in, for example, a price range associated to the client device. For example, a client device associated with a consumer profile comprising, for example, a 5-million-dollar home may be best served by an agent device who has successfully sold $5 million homes and above. Whereas a client device associated with a consumer profile comprising a $100,000 home is best served by an agent device associated with a track record of selling homes in this price range.

In some embodiments, a time period on either of these variables. For example, the last 12 months.

Both the sales volume and client device rankings are dynamically changing variable according to the client devices and experiences of home sales prices. One bad referral can reduce the average and move agent devices around constantly in terms of top cumulative ratings. The same can be true for the average homes prices.

About the agent device ratings variable.

In some embodiments, opportunity scorer 2003 may receive interactions from client devices to rate one or more agent devices based on interaction history.

In some embodiments, ratings given to each agent device by the consumers may be averaged.

One consumer ranks the agent device 5 stars
Another consumer ranks the agent device 4 stars.
Yet another ranks the agent device 3 stars.
Whereby an average is 3 stars.

One negative referral may reduce the average and move agent devices change the ranking of agent devices ahead or behind each other This may be dynamic because another agent device may have received a higher ranking in the recent 6 months, for example. Or perhaps an agent device got a series of unfavorable ratings in the last six months. Because the agent devices are dynamically ranked by the consumers the average rating will vary from month to month.

A second variable may be average sales prices of homes either listed or sold on behalf of consumers of homes In some embodiments, systems described herein may not require the client device or agent device to input any data into the system. Data may use to determine a location and average price of home either to buy or list is gathered by the device when the user accesses the system. When interactions are received by users access, the device identifies a location of each home they reviewed or their home they live in, then computes an average sales price and then matches this data with a database (or from an external service) that may have home valuation report for a plurality of addresses (for example, these home valuation reports may generally be compiled monthly for the entire country).

In some embodiments, criteria used may be a fifth variable whereby a matching of data collected by the client device and data collected through the system that presents a summary of the average sold price or homes listed or purchased by the agent device.

Initially, the agent device will input in an associated system profile when the registered in the system, whereby the average price of homes they either listed and sold over the last few years.

Figure 14:
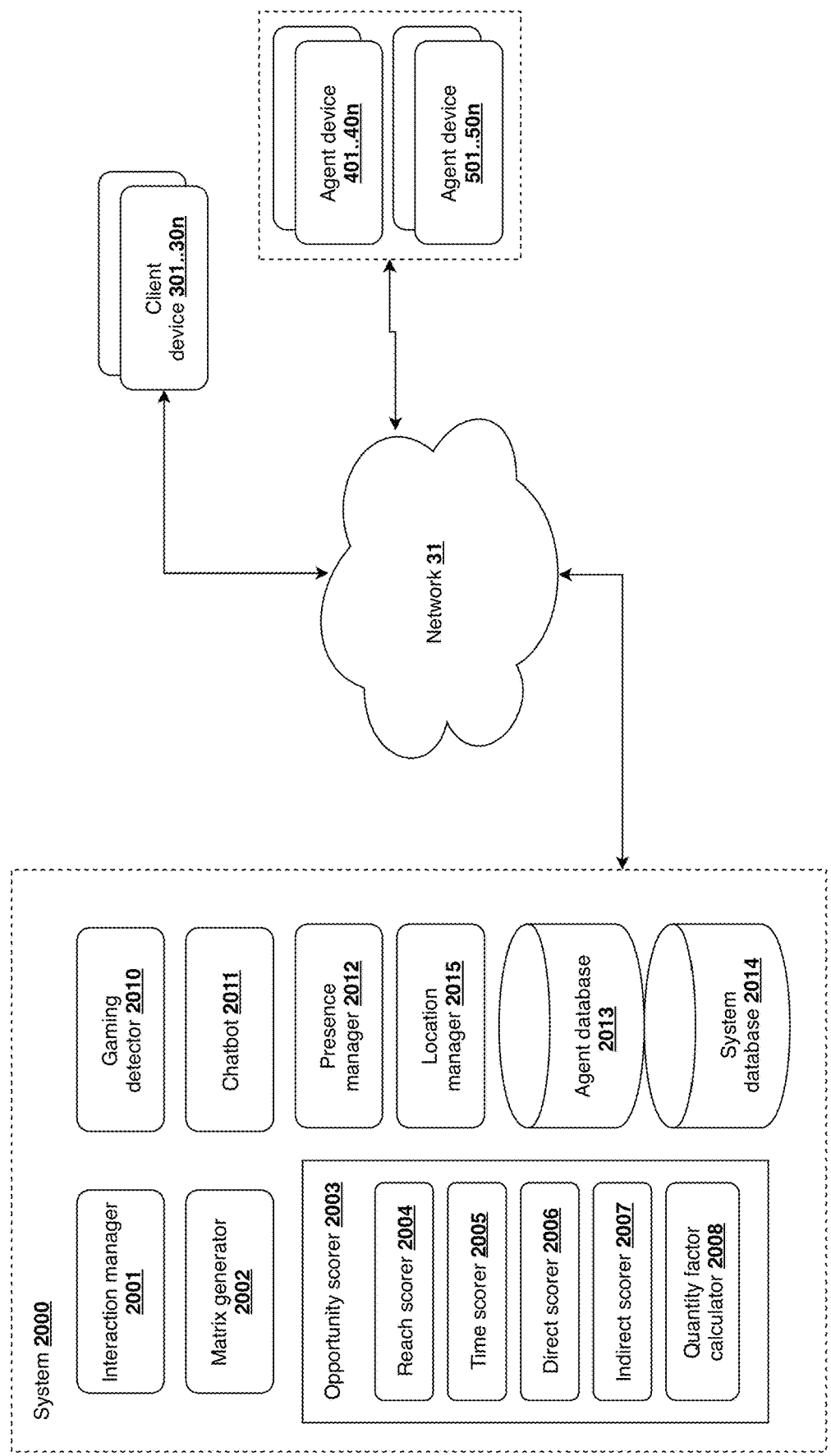
FIG. 14 is a block diagram illustrating a conceptual arrangement of components for a system for hierarchical relationship matrix opportunity scoring, according to a preferred embodiment of the invention.

FIG. 14 is a block diagram illustrating a conceptual arrangement of components for a system for hierarchical relationship matrix opportunity scoring, according to a preferred embodiment of the invention. According to the embodiment, a hierarchical relationship matrix opportunity scoring computer comprises a processor, a memory and a plurality of programming instructions stored in the memory, the plurality of programming instructions when executed by the processor cause the processor to generate a relationship matrix comprising at least a portion of agent devices 401 . . . 40$n$, agent devices 501 . . . 50$n$, and client devices 301 . . . 30$n$, by scoring devices using one or more of a plurality of opportunity scorers 2003. In a preferred embodiment, the hierarchical relationship matrix opportunity scoring computer 2000 comprises, at least:

Interaction manager 2001 to manage interactions between at least a portion of agent devices 401 . . . 40$n$, agent devices 501 . . . 50$n$, and client devices 301 . . . 30$n$. Interactions may comprise a number of communication techniques such as voice, video, text-based, cellular, VoIP, and other forms of communication. An interaction may comprise a transaction whereby business information within the interaction may be in the form of, for example, a text-based question, a request, or an instruction that may trigger other components to modify functionality. For example, ask-the-expert, calendaring appointments, establish communications, enable a chatbot 2011 process, and the like.

Matrix generator 2002 comprises programming instructions that when executed by the processor cause the processor to construct a relationship matrix between at least a portion of agent devices 401 . . . 40$n$, agent devices 501 . . . 50$n$, and client devices 301 . . . 30$n$ as described in the methods disclosed herein.

Opportunity scorer 2003 comprises: reach scorer 2004, time scorer 2005, direct scorer 2006, indirect scorer 2007, quantity factor calculator 2008 for computing a score for at least a portion of agent devices 401 . . . 40n, agent devices 501 . . . 50n, and client devices 301 . . . 30n, Gaming detector 2010 using methods described herein.

Chatbot 2011 comprises a plurality of programming instructions that when executed by the processor cause the processor to automatically conduct a conversation via auditory or textual methods to simulate how a human would behave as a conversational partner. Methods described herein disclose how chatbot 2011 is used in an interaction system, such as the one disclosed herein, for various practical purposes including automatic communication with at least a portion of agent devices 401 . . . 40n, agent devices 501 . . . 50n, and client devices 301 . . . 30n, or information acquisition from system 2000. Chatbot 2011 may use natural language processing systems known in the art, and/or scan for keywords within the input, then pull a reply with the most matching keywords, or the most similar wording pattern, from system database 2014 or real-time within communications managed by interaction manager 2001.

Presence manager 2012 manages a communication status for at least a portion of agent devices 401 . . . 40n, agent devices 501 . . . 50n, and client devices 301 . . . 30n, for example, available, busy, waiting, after-work, and the like.

Location manager 2015 manages and stores a geolocation for at least a portion of agent devices 401 . . . 40n, agent devices 501 . . . 50n, and client devices 301 . . . 30n.

Agent database 2013 manages data record for registered and unregistered agent devices 401 . . . 40n, agent devices 501 . . . 50n System database 2014 manages data record for client devices 301 . . . 30n, and transaction information from interaction manager 2001.

The skilled person will be aware of a range of possible modifications of the various embodiments described above. Accordingly, the present invention is defined by the claims and their equivalents.

What is claimed is:

1. A system for forming a relationship matrix and establishing communication for a plurality of user devices, the system comprising:
   a network-connected relationship matrix management computer comprising a memory, a processor, and a plurality of programmable instructions stored in the memory and operating on the processor, the plurality of programmable instructions when executed by the processor, cause the processor to:
   receive a plurality of connections from a plurality of user devices, wherein the plurality of user devices comprises, at least, a plurality of remote devices, a plurality of direct client devices, and a plurality of indirect client devices;
   assign a plurality of first unique IDs to the plurality of user devices;
   receive a plurality of geographic device locations associated to the plurality of user devices, comprising a first location, wherein the first location is a browsing location;
   identify one or more remote devices, the one or more remote devices associated with the first location;
   assign a plurality of second unique IDs associated to the plurality of remote devices;
   form a relationship matrix comprising first unique IDs associated with each user device of the plurality of user devices and second unique IDs associated with each remote device, of the plurality of remote devices, wherein the relationship matrix is a hierarchical connectivity structure, such that each remote device is a top-level node in the hierarchical connectivity structure, having a plurality of first connections with at least a subset of the plurality of direct client devices, and each direct device of the subset of the plurality of direct client devices having a plurality of second connections with at least a subset of the plurality of indirect client devices;
   compute an opportunity score for each of the one or more remote devices in the relationship matrix, wherein the opportunity score is computed based at least on a sum of a time factor score, a reach factor score, a direct factor score, and an indirect factor score, for each remote device, wherein:
      the time factor score is computed based on a cumulative time comprising a time spent on a first activity by a direct client device from the plurality of direct client devices, and a time spent on a second activity by an indirect client device from the plurality of indirect client devices;
      the reach factor score is computed based on:
         a reach factor for each remote device comprising a distance between an opportunity pool and an associated activity zone for each remote device, wherein the opportunity pool is indicative of collection of remote devices having a quantified potential to receive an opportunity, and wherein the activity zone is created in response to a performance of the first activity by the direct client device at the browsing location, and
         a first weighted factor,
         the reach factor score computed by a multiplication of the first weighted factor with an associated reach factor for each remote device and a result of the multiplication divided by a sum of reach factors for each of the one or more remote devices;
      the direct factor score is computed using a number of direct client devices available for each remote device and a second weighted factor; and
      the indirect factor score is computed using a number of indirect client devices available for each remote device and a third weighted factor;
   select a first remote device of the one or more remote devices based at least on the computed opportunity score for the first remote device; and
   simultaneously establish a communication path establishing communication operability between the user device and the first remote device.

2. The system of claim 1, wherein to compute the opportunity score the plurality of programmable instructions when executed by the processor, further cause the processor to:
   calculate a quantity factor; and
   compute the opportunity score by aggregating at least a portion of the reach factor score, the time score, the direct factor score, the indirect factor score, and the quantity factor.

3. The system of claim 1, wherein each location of the plurality of geographic device locations is selected from one or more of the group consisting of global positioning data, network-based positioning data, a civic address, and a property profile.

4. The system of claim 1, wherein the first location is determined by a first property profile.

5. The system of claim 4, wherein the first location is determined by a comparison of a determined property profile associated with the request to a record corresponding to a first geographic area associated with the user device.

6. The system of claim 2, wherein the plurality of programmable instructions when executed by the processor, further cause the processor to:
  analyze presence information for each remote device, of the one or more remote devices, based on the opportunity score for each of the one or more remote devices; and
  select the first remote device based on the presence information.

7. The system of claim 1, wherein the communication comprises at least one of: a telephone call, an electronic text message, an email, a chatbot, a tactile response to a display screen of the user device or the first remote device, or both.

8. The system of claim 1, wherein the plurality of programmable instructions when executed by the processor, further cause the processor to provide an alert to the first remote device prior to establishing a communication path operability between the user device and the first remote device.

9. The system of claim 8, wherein the alert is selected from the group consisting of a text message, a phone call, a notification onto a display screen of the client device, a chatbot, and a sound.

10. The system of claim 1, wherein the first location further comprises geographical location associated with the client device.

* * * * *